United States Patent
Brendel et al.

(10) Patent No.: US 12,415,229 B2
(45) Date of Patent: Sep. 16, 2025

(54) FRICTION STIR WELDING SYSTEMS AND METHODS

(71) Applicant: Blue Origin Manufacturing, LLC, Huntsville, AL (US)

(72) Inventors: Michael S. Brendel, Bellevue, WA (US); Ilana K. Lu, Merritt Island, FL (US); Roger Conant Carter, IV, Merritt Island, FL (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/438,369

(22) Filed: Feb. 9, 2024

(65) Prior Publication Data

US 2024/0173791 A1    May 30, 2024

Related U.S. Application Data

(62) Division of application No. 17/386,190, filed on Jul. 27, 2021, now abandoned.
(Continued)

(51) Int. Cl.
*B23K 20/00* (2006.01)
*B23K 20/12* (2006.01)
*B23K 103/10* (2006.01)

(52) U.S. Cl.
CPC ...... *B23K 20/1225* (2013.01); *B23K 20/1245* (2013.01); *B23K 2103/10* (2018.08)

(58) Field of Classification Search
CPC .............. B23K 20/1245; B23K 20/122; B23K 20/1235; B23K 20/125; B23K 20/126;
(Continued)

(56) References Cited

U.S. PATENT DOCUMENTS 3,069,847 A    12/1962  Vest, Jr.
3,414,699 A *  12/1968  Van Gulik ............. B23K 9/205
                                                                219/98
(Continued)

FOREIGN PATENT DOCUMENTS

AU    2014274824 A1    12/2015
AU    2018359514 B2    10/2018
(Continued)

OTHER PUBLICATIONS

Computer English translation CN-107414281-A (Year: 2023).
(Continued)

*Primary Examiner* — Erin B Saad
(74) *Attorney, Agent, or Firm* — Summit Patents, PC

(57) ABSTRACT

A friction stir welding system can reduce the likelihood of oxide formation in the work pieces being friction stir welded by forming an inert gas atmosphere in which the friction stir welding process is performed. The friction stir welding system includes one or more inert purge gas sources that direct inert purge gas towards the forming friction stir weld. The inert purge gas can be directed towards the forming weld from both an upper and a lower side, which further reduces the likelihood of oxide formation. Additionally, the friction stir welding system can include one or more housings that contains the inert purge gas about the forming friction stir weld, such as about an upper and lower side of the friction stir weld.

18 Claims, 5 Drawing Sheets

Related U.S. Application Data

(60) Provisional application No. 63/058,341, filed on Jul. 29, 2020.

(58) Field of Classification Search
CPC .... B23K 20/123; B23K 20/12; B23K 37/003; B23K 20/129; B23K 37/0294; B23K 37/0461; B23K 9/291
See application file for complete search history.

(56) References Cited

U.S. PATENT DOCUMENTS

| | | |
|---|---|---|
| 3,585,800 A | 6/1971 | Kuntz |
| 3,737,976 A | 6/1973 | Lieberman et al. |
| 3,875,364 A * | 4/1975 | Boyett ................... B23K 9/167 219/136 |
| 4,000,074 A * | 12/1976 | Evans ..................... B04B 3/025 494/47 |
| 4,364,067 A | 12/1982 | Koto et al. |
| 4,436,977 A * | 3/1984 | Cash ....................... B23K 9/325 219/72 |
| 5,233,755 A | 8/1993 | Vandendriessche |
| 5,393,949 A * | 2/1995 | Stricklen ................ B23K 9/325 219/74 |
| 5,697,511 A | 12/1997 | Bampton |
| 5,780,804 A * | 7/1998 | White ................... B23K 9/0061 219/121.45 |
| 5,971,252 A | 10/1999 | Rosen et al. |
| 6,050,474 A | 4/2000 | Aota et al. |
| 6,050,475 A * | 4/2000 | Kinton ................. B23K 20/121 228/2.1 |
| 6,151,887 A | 11/2000 | Hadin |
| 6,536,651 B2 | 3/2003 | Ezumi et al. |
| 6,543,671 B2 | 4/2003 | Hatten et al. |
| 6,606,851 B1 | 8/2003 | Herdy, Jr. |
| 6,669,075 B2 | 12/2003 | Colligan |
| 6,779,707 B2 | 8/2004 | Dracup et al. |
| 7,090,112 B2 | 8/2006 | Masingale |
| 7,093,470 B2 | 8/2006 | El-Soudani |
| 7,097,091 B2 | 8/2006 | Okamura et al. |
| 7,128,532 B2 | 10/2006 | Petervary |
| 7,354,657 B2 | 4/2008 | Mishra |
| 7,430,888 B2 | 10/2008 | Osame |
| 7,556,187 B2 | 7/2009 | Sunahara et al. |
| 7,735,223 B2 | 6/2010 | Clark |
| 7,748,592 B2 * | 7/2010 | Koga ................. B23K 37/0217 228/2.1 |
| 7,828,191 B2 * | 11/2010 | Ohashi ............... B23K 20/1255 228/2.1 |
| 7,832,613 B2 * | 11/2010 | Hanlon ............. B23K 20/1245 228/2.1 |
| 7,854,958 B2 | 12/2010 | Kramer |
| 7,866,532 B1 | 1/2011 | Potter et al. |
| 8,002,168 B2 | 8/2011 | Boman |
| 8,079,126 B2 | 12/2011 | Bampton et al. |
| 8,114,474 B1 | 2/2012 | Dudt et al. |
| 8,141,764 B1 | 3/2012 | Potter et al. |
| 8,272,424 B2 | 9/2012 | Short |
| 8,316,916 B2 | 11/2012 | Heinrich et al. |
| 8,348,136 B1 | 1/2013 | Potter et al. |
| 8,397,974 B2 | 3/2013 | Schultz et al. |
| 8,632,850 B2 | 1/2014 | Schultz et al. |
| 8,636,194 B2 | 1/2014 | Schultz et al. |
| 8,710,144 B2 | 4/2014 | Hesse et al. |
| 8,782,892 B2 | 7/2014 | Seo et al. |
| 8,875,976 B2 | 11/2014 | Schultz et al. |
| 8,893,954 B2 | 11/2014 | Schultz et al. |
| 8,998,064 B2 * | 4/2015 | Russell ............. B23K 20/1235 228/2.1 |
| 9,027,378 B2 | 5/2015 | Crump et al. |
| 9,050,688 B2 * | 6/2015 | Yamaguchi .......... B23K 20/125 |
| 9,090,950 B2 | 7/2015 | Hales et al. |
| 9,101,979 B2 | 8/2015 | Hofmann et al. |
| 9,126,367 B1 | 9/2015 | Mark et al. |
| 9,205,578 B2 | 12/2015 | Schultz et al. |
| 9,233,438 B2 | 1/2016 | Phelan et al. |
| 9,238,283 B2 | 1/2016 | Gniesmer |
| 9,266,191 B2 | 2/2016 | Kandasamy et al. |
| 9,511,445 B2 | 12/2016 | Kandasamy |
| 9,511,446 B2 | 12/2016 | Kandasamy et al. |
| 9,555,580 B1 | 1/2017 | Dykstra et al. |
| 9,555,871 B2 | 1/2017 | Grip et al. |
| 9,610,650 B2 | 4/2017 | Hofmann et al. |
| 9,611,803 B2 | 4/2017 | Vieira De Morais et al. |
| 9,643,279 B2 | 5/2017 | Schultz et al. |
| 9,757,802 B2 | 9/2017 | Cui et al. |
| 9,862,054 B2 | 1/2018 | Kandasamy et al. |
| 9,931,789 B2 | 4/2018 | Wiesner et al. |
| 9,937,587 B2 | 4/2018 | Kou et al. |
| 9,943,929 B2 | 4/2018 | Schultz et al. |
| 9,962,787 B2 * | 5/2018 | Sugimoto .......... B23K 20/1245 |
| 10,011,089 B2 | 7/2018 | Lyons et al. |
| 10,022,796 B2 | 7/2018 | Wang |
| 10,105,790 B2 | 10/2018 | Kandasamy |
| 10,254,499 B1 | 4/2019 | Cohen et al. |
| 10,259,041 B2 | 4/2019 | Gessler et al. |
| 10,279,422 B2 | 5/2019 | Werz et al. |
| 10,335,854 B2 | 7/2019 | Wiesner et al. |
| 10,500,674 B2 | 12/2019 | Kandasamy et al. |
| 10,543,529 B2 | 1/2020 | Schwarze et al. |
| 10,583,519 B2 | 3/2020 | Litwinski |
| 10,583,631 B2 | 3/2020 | Kandasamy et al. |
| 10,625,374 B2 | 4/2020 | Schwarze |
| 10,661,379 B1 * | 5/2020 | Larsson ................. B23K 37/08 |
| 10,670,019 B2 | 6/2020 | Zinniel et al. |
| 10,724,561 B2 | 7/2020 | Amira et al. |
| 10,796,727 B1 | 10/2020 | Coffey et al. |
| 10,857,596 B1 | 12/2020 | Mittendorf et al. |
| 10,889,098 B2 | 1/2021 | Yamazaki et al. |
| 10,906,127 B2 | 2/2021 | Seo et al. |
| 10,953,489 B2 | 3/2021 | Fröhlke et al. |
| 11,014,292 B2 | 5/2021 | Marchione |
| 11,077,607 B2 | 8/2021 | Snyder et al. |
| 11,219,951 B2 | 1/2022 | Matthews et al. |
| 11,229,972 B2 | 1/2022 | Mosaki et al. |
| 11,260,468 B2 | 3/2022 | Frank et al. |
| 11,305,375 B2 * | 4/2022 | Landmark ........... B23K 20/123 |
| 11,311,959 B2 | 4/2022 | Hardwick et al. |
| 11,415,380 B2 | 8/2022 | Chipko et al. |
| 11,549,157 B2 * | 1/2023 | Singh ................. B23K 20/1275 |
| 11,578,395 B2 | 2/2023 | Hales et al. |
| 2002/0014070 A1 | 2/2002 | Stechman, Jr. et al. |
| 2003/0042292 A1 | 3/2003 | Hatten et al. |
| 2003/0057258 A1 * | 3/2003 | Ishida ................. B23K 20/1245 228/175 |
| 2003/0098335 A1 * | 5/2003 | Saeki ................. B23K 20/1255 228/2.1 |
| 2003/0126856 A1 * | 7/2003 | Lair ........................ F02K 1/383 60/770 |
| 2003/0192941 A1 | 10/2003 | Ishida et al. |
| 2004/0060965 A1 | 4/2004 | Mishra |
| 2004/0074949 A1 | 4/2004 | Narita et al. |
| 2004/0107019 A1 | 6/2004 | Keshovmurthy et al. |
| 2004/0155094 A1 | 8/2004 | Okamoto et al. |
| 2005/0035173 A1 | 2/2005 | Steel et al. |
| 2005/0045694 A1 * | 3/2005 | Subramanian ......... B23K 37/06 228/112.1 |
| 2005/0242158 A1 | 11/2005 | Bolser |
| 2005/0279810 A1 | 12/2005 | Stol et al. |
| 2006/0086707 A1 * | 4/2006 | Kou ....................... B23K 28/02 219/137 R |
| 2006/0102699 A1 | 5/2006 | Burton et al. |
| 2006/0169741 A1 | 8/2006 | Smith et al. |
| 2006/0289604 A1 | 12/2006 | Zettler et al. |
| 2007/0152015 A1 | 7/2007 | Burton et al. |
| 2007/0158343 A1 | 7/2007 | Shimada et al. |
| 2007/0194051 A1 | 8/2007 | Bakken et al. |
| 2007/0199978 A1 | 8/2007 | Ezumi |
| 2007/0228104 A1 * | 10/2007 | Mankus ............... B23K 20/125 228/101 |
| 2008/0096038 A1 | 4/2008 | Nagano |
| 2008/0128473 A1 | 6/2008 | Zhou et al. |

(56) References Cited

U.S. PATENT DOCUMENTS

| | | | |
|---|---|---|---|
| 2009/0090700 A1* | 4/2009 | Sato | B23K 28/02 228/110.1 |
| 2009/0166395 A1* | 7/2009 | Nakata | B23K 37/003 228/112.1 |
| 2009/0188109 A1 | 7/2009 | Bampton et al. | |
| 2010/0084437 A1* | 4/2010 | Biggs | B22D 37/005 222/603 |
| 2010/0140321 A1 | 6/2010 | Eller et al. | |
| 2010/0167083 A1 | 7/2010 | Park et al. | |
| 2010/0176182 A1* | 7/2010 | Hanlon | B23K 20/126 228/2.1 |
| 2010/0242843 A1 | 9/2010 | Peretti et al. | |
| 2010/0252169 A1 | 10/2010 | Feng et al. | |
| 2010/0285207 A1 | 11/2010 | Creehan et al. | |
| 2011/0062219 A1 | 3/2011 | Bezaire et al. | |
| 2011/0262695 A1 | 10/2011 | Lee et al. | |
| 2011/0266330 A1 | 11/2011 | Bruck et al. | |
| 2011/0315367 A1 | 12/2011 | Romero et al. | |
| 2012/0009339 A1 | 1/2012 | Creehan et al. | |
| 2012/0058359 A1 | 3/2012 | Kingston et al. | |
| 2012/0073732 A1 | 3/2012 | Perlman | |
| 2012/0114861 A1 | 5/2012 | Cohen et al. | |
| 2012/0273555 A1 | 11/2012 | Flak et al. | |
| 2012/0279441 A1 | 11/2012 | Creehan et al. | |
| 2012/0279442 A1 | 11/2012 | Creehan et al. | |
| 2013/0056912 A1 | 3/2013 | O'neill et al. | |
| 2013/0068825 A1 | 3/2013 | Rosal et al. | |
| 2013/0221069 A1* | 8/2013 | Saito | B23K 20/126 228/2.1 |
| 2014/0130736 A1 | 5/2014 | Schultz et al. | |
| 2014/0134325 A1 | 5/2014 | Schultz et al. | |
| 2014/0138332 A1 | 5/2014 | Loree | |
| 2014/0165399 A1 | 6/2014 | Seo et al. | |
| 2014/0174344 A1 | 6/2014 | Scuhltz et al. | |
| 2014/0174361 A1* | 6/2014 | Chen | C23C 16/45565 118/723 R |
| 2014/0183245 A1* | 7/2014 | Yamaguchi | B23K 20/127 228/2.1 |
| 2014/0274726 A1 | 9/2014 | Sugimoto et al. | |
| 2015/0079306 A1 | 3/2015 | Schoeneborn et al. | |
| 2015/0165546 A1 | 6/2015 | Kandasamy et al. | |
| 2015/0274280 A1 | 10/2015 | Sheahan, Jr. | |
| 2015/0321289 A1 | 11/2015 | Bruck et al. | |
| 2016/0074958 A1 | 3/2016 | Kandasamy et al. | |
| 2016/0075059 A1 | 3/2016 | Williams | |
| 2016/0090848 A1 | 3/2016 | Engeli et al. | |
| 2016/0107262 A1 | 4/2016 | Schultz et al. | |
| 2016/0169012 A1 | 6/2016 | Dacunha et al. | |
| 2016/0175981 A1 | 6/2016 | Kandasamy et al. | |
| 2016/0175982 A1 | 6/2016 | Kandasamy et al. | |
| 2016/0193689 A1* | 7/2016 | Sugimoto | B23K 20/123 228/114.5 |
| 2016/0221117 A1* | 8/2016 | Taniguchi | C21D 1/42 |
| 2016/0258298 A1 | 9/2016 | Channel et al. | |
| 2016/0363390 A1 | 12/2016 | Karlen et al. | |
| 2017/0022615 A1 | 1/2017 | Arndt et al. | |
| 2017/0043429 A1 | 2/2017 | Kandasamy et al. | |
| 2017/0057204 A1 | 3/2017 | Kandasamy et al. | |
| 2017/0080519 A1 | 3/2017 | Atin et al. | |
| 2017/0150602 A1 | 5/2017 | Johnston et al. | |
| 2017/0197274 A1 | 7/2017 | Steel et al. | |
| 2017/0216962 A1 | 8/2017 | Schultz et al. | |
| 2017/0284206 A1 | 10/2017 | Reberts et al. | |
| 2017/0291221 A1 | 10/2017 | Swank et al. | |
| 2017/0299120 A1 | 10/2017 | Stachulla et al. | |
| 2017/0312850 A1 | 11/2017 | Werz et al. | |
| 2018/0047645 A1 | 2/2018 | Varadarajan et al. | |
| 2018/0085849 A1 | 3/2018 | Kandasamy et al. | |
| 2018/0126636 A1 | 5/2018 | Jang | |
| 2018/0257141 A1 | 9/2018 | Hofmann et al. | |
| 2018/0296343 A1 | 10/2018 | Wei | |
| 2018/0361501 A1 | 12/2018 | Hardwick et al. | |
| 2019/0054534 A1 | 2/2019 | Norton et al. | |
| 2019/0168304 A1 | 6/2019 | Krol et al. | |
| 2019/0193194 A1 | 6/2019 | Grong et al. | |
| 2019/0210152 A1 | 7/2019 | Konitzer | |
| 2019/0217508 A1 | 7/2019 | McGinnis et al. | |
| 2019/0299290 A1 | 10/2019 | Kuhns et al. | |
| 2019/0388128 A1 | 12/2019 | Wilson et al. | |
| 2020/0016687 A1 | 1/2020 | Whalen et al. | |
| 2020/0047279 A1 | 2/2020 | Misak | |
| 2020/0063242 A1 | 2/2020 | Angels | |
| 2020/0101559 A1 | 4/2020 | Rose et al. | |
| 2020/0180297 A1 | 6/2020 | Carter et al. | |
| 2020/0189025 A1 | 6/2020 | Rodriguez | |
| 2020/0198046 A1 | 6/2020 | Imaizumi et al. | |
| 2020/0209107 A1 | 7/2020 | Ream et al. | |
| 2020/0247058 A1 | 8/2020 | Flitsch et al. | |
| 2020/0262001 A1 | 8/2020 | Uetani | |
| 2020/0290127 A1 | 9/2020 | Berglund et al. | |
| 2020/0306869 A1 | 10/2020 | Hardwick et al. | |
| 2020/0332421 A1 | 10/2020 | Jahdie et al. | |
| 2020/0338639 A1 | 10/2020 | Friesth | |
| 2021/0008658 A1 | 1/2021 | Frank et al. | |
| 2021/0048053 A1 | 2/2021 | Ahn | |
| 2021/0053283 A1 | 2/2021 | Liu et al. | |
| 2021/0069778 A1 | 3/2021 | Redding et al. | |
| 2021/0078258 A1 | 3/2021 | Lalande et al. | |
| 2021/0180165 A1 | 6/2021 | Pasebani et al. | |
| 2021/0245293 A1 | 8/2021 | Hardwick et al. | |
| 2021/0308937 A1 | 10/2021 | Broach et al. | |
| 2021/0379664 A1 | 12/2021 | Gibson et al. | |
| 2021/0387253 A1 | 12/2021 | Schweizer et al. | |
| 2022/0016834 A1 | 1/2022 | West | |
| 2022/0023821 A1 | 1/2022 | Aimone et al. | |
| 2022/0049331 A1 | 2/2022 | Angels | |
| 2022/0080522 A1 | 3/2022 | Cox et al. | |
| 2022/0088681 A1 | 3/2022 | Chehab | |
| 2022/0176451 A1 | 6/2022 | Schweizer et al. | |
| 2022/0389543 A1 | 12/2022 | Chehab | |
| 2024/0100624 A1 | 3/2024 | Hardwick et al. | |
| 2024/0109245 A1 | 4/2024 | Lalande et al. | |
| 2024/0173791 A1* | 5/2024 | Brendel | B23K 20/1225 |

FOREIGN PATENT DOCUMENTS

| | | |
|---|---|---|
| AU | 2018359514 A1 | 5/2019 |
| AU | 2019234726 A1 | 9/2019 |
| AU | 2019290657 A1 | 12/2019 |
| AU | 2019338384 A1 | 3/2020 |
| AU | 2019383418 A1 | 5/2020 |
| AU | 2018359514 C1 | 5/2021 |
| CA | 2569350 A1 | 5/2007 |
| CA | 2569773 C | 4/2013 |
| CA | 3081330 A1 | 10/2018 |
| CA | 3093812 A1 | 3/2019 |
| CA | 3104289 A1 | 6/2019 |
| CA | 3112446 A1 | 9/2019 |
| CA | 3120796 A1 | 11/2019 |
| CN | 101629290 A | 1/2010 |
| CN | 101657289 A | 2/2010 |
| CN | 101537538 B | 1/2011 |
| CN | 101537539 B | 1/2011 |
| CN | 102069172 A | 5/2011 |
| CN | 101406987 B | 3/2012 |
| CN | 203843367 U | 9/2014 |
| CN | 109202271 A | 1/2015 |
| CN | 104439686 A | 3/2015 |
| CN | 103639668 B | 12/2015 |
| CN | 105290608 A | 2/2016 |
| CN | 105750725 A | 7/2016 |
| CN | 103978304 B | 9/2016 |
| CN | 105965152 A | 9/2016 |
| CN | 106001905 A | 10/2016 |
| CN | 106735851 A | 5/2017 |
| CN | 107030371 A | 8/2017 |
| CN | 206366652 U | 8/2017 |
| CN | 107160029 | 9/2017 |
| CN | 107160030 A | 9/2017 |
| CN | 107160109 A | 9/2017 |
| CN | 107414281 | 12/2017 |
| CN | 107414281 A | 12/2017 |
| CN | 107498175 A | 12/2017 |

(56) References Cited

FOREIGN PATENT DOCUMENTS

| | | |
|---|---|---|
| CN | 206925453 U | 1/2018 |
| CN | 107813044 A | 3/2018 |
| CN | 107841744 A | 3/2018 |
| CN | 108372359 A | 8/2018 |
| CN | 108385101 A | 8/2018 |
| CN | 108838509 A | 11/2018 |
| CN | 109202273 A | 1/2019 |
| CN | 109261940 A | 1/2019 |
| CN | 107584122 B | 2/2019 |
| CN | 107116366 B | 3/2019 |
| CN | 109940524 A | 6/2019 |
| CN | 110042385 A | 7/2019 |
| CN | 209272731 U | 8/2019 |
| CN | 110653618 A | 1/2020 |
| CN | 107900510 B | 2/2020 |
| CN | 110834179 A | 2/2020 |
| CN | 111331246 A | 2/2020 |
| CN | 110933791 A | 3/2020 |
| CN | 109878084 B | 6/2020 |
| CN | 108971742 B | 7/2020 |
| CN | 109202273 B | 9/2020 |
| CN | 111655403 A | 9/2020 |
| CN | 211464825 U | 9/2020 |
| CN | 109202275 B | 10/2020 |
| CN | 111761198 A | 10/2020 |
| CN | 108603504 B | 11/2020 |
| CN | 109940163 B | 12/2020 |
| CN | 108930034 B | 1/2021 |
| CN | 109202272 B | 2/2021 |
| CN | 109570934 B | 2/2021 |
| CN | 109967860 B | 3/2021 |
| CN | 110640294 B | 4/2021 |
| CN | 109570933 B | 5/2021 |
| CN | 112770884 A | 5/2021 |
| CN | 110102871 B | 6/2021 |
| CN | 111531266 B | 8/2021 |
| CN | 111230282 B | 10/2021 |
| CN | 113523534 A | 10/2021 |
| CN | 113695573 A | 11/2021 |
| CN | 113695593 A | 11/2021 |
| CN | 111055007 B | 1/2022 |
| CN | 111575698 B | 5/2022 |
| CN | 111575699 B | 5/2022 |
| CN | 112025074 B | 7/2022 |
| CN | 107160029 B | 12/2022 |
| DE | 19948441 A1 | 4/2001 |
| DE | 202015002830 U1 | 4/2015 |
| DE | 102014115535 B3 | 3/2016 |
| DE | 102015216802 A1 | 3/2017 |
| DE | 102016113289 A1 | 1/2018 |
| DE | 102019106873 A1 | 9/2020 |
| DE | 102019007902 A1 | 5/2021 |
| EP | 1206995 A2 | 5/2002 |
| EP | 1413384 A2 | 4/2004 |
| EP | 3251768 A1 | 12/2017 |
| EP | 3703888 A1 | 10/2018 |
| EP | 4129552 A1 | 2/2023 |
| GB | 2306366 A | 5/1997 |
| GB | 2576260 B | 2/2020 |
| JP | H 1147960 A | 2/1999 |
| JP | H 11156561 A | 6/1999 |
| JP | 2000094159 A | 4/2000 |
| JP | 2000249455 A | 9/2000 |
| JP | 2000347917 A | 12/2000 |
| JP | 20000334577 A | 12/2000 |
| JP | 2003-322135 A | 11/2003 |
| JP | 2004025296 A | 1/2004 |
| JP | 3563003 B2 | 9/2004 |
| JP | 2004261859 A | 9/2004 |
| JP | 2004-311640 A | 11/2004 |
| JP | 2005-171299 A | 6/2005 |
| JP | 2007-061875 A | 3/2007 |
| JP | 2009006396 A | 1/2009 |
| JP | 2009-090295 A | 4/2009 |
| JP | 4299266 B2 | 7/2009 |
| JP | 2010-194557 A | 9/2010 |
| JP | 5071144 B2 | 11/2012 |
| JP | 5573973 B2 | 1/2013 |
| JP | 6046954 B2 | 2/2013 |
| JP | 2013166159 A | 8/2013 |
| JP | 5326757 B2 | 10/2013 |
| JP | 5864446 B2 | 2/2016 |
| JP | 6201882 B2 | 9/2017 |
| JP | 6365752 B2 | 8/2018 |
| JP | 2020032429 A | 3/2020 |
| JP | 2020059039 A | 4/2020 |
| JP | 6909034 B2 | 7/2021 |
| JP | 2022-503795 A | 1/2022 |
| JP | 7148491 B2 | 10/2022 |
| KR | 10-0354387 B1 | 12/2002 |
| KR | 10-0772131 B1 | 11/2007 |
| KR | 20100113400 A | 10/2010 |
| KR | 20110003572 A | 1/2011 |
| KR | 20110019270 A | 2/2011 |
| KR | 20110088266 A | 8/2011 |
| KR | 10-1194097 B1 | 10/2012 |
| KR | 10-1230359 B1 | 2/2013 |
| KR | 20160128939 A | 11/2016 |
| KR | 20180044625 A | 5/2018 |
| KR | 2021113973 | 9/2019 |
| KR | 20210049085 A | 9/2019 |
| KR | 10-2101364 B1 | 4/2020 |
| KR | 20200087172 A | 7/2020 |
| KR | 20210010980 A | 1/2021 |
| KR | 10-2273514 B1 | 6/2021 |
| KR | 20210130704 A | 10/2021 |
| TW | I688451 B | 3/2020 |
| WO | WO 1998/051441 A1 | 11/1998 |
| WO | WO 2000/020146 A1 | 4/2000 |
| WO | WO 2007/102540 A1 | 9/2007 |
| WO | WO 2009/127981 A2 | 10/2009 |
| WO | WO 2009/142070 A1 | 11/2009 |
| WO | WO 2011/017752 A1 | 2/2011 |
| WO | WO 2012/065616 A1 | 5/2012 |
| WO | WO 2012/141442 A2 | 10/2012 |
| WO | WO 2013/076884 A1 | 5/2013 |
| WO | WO 2014/057948 A1 | 4/2014 |
| WO | WO 2014/178731 A2 | 11/2014 |
| WO | WO 2015/060007 A1 | 4/2015 |
| WO | WO 2015/198910 A1 | 12/2015 |
| WO | WO 2016/072211 A1 | 5/2016 |
| WO | WO 2016/106179 A1 | 6/2016 |
| WO | WO 2016/111279 A1 | 7/2016 |
| WO | WO 2017/075396 A1 | 5/2017 |
| WO | WO 2019/089764 A1 | 5/2019 |
| WO | WO 2019/099928 A2 | 5/2019 |
| WO | WO 2019/115968 A1 | 6/2019 |
| WO | WO 2019/172300 A1 | 9/2019 |
| WO | WO 2019/178138 A2 | 9/2019 |
| WO | WO 2019/178138 A3 | 9/2019 |
| WO | WO 2019/198290 A1 | 10/2019 |
| WO | WO 2019/246251 A9 | 12/2019 |
| WO | WO 2020/015228 A1 | 1/2020 |
| WO | WO 2020/055989 A1 | 3/2020 |
| WO | WO 2020/106952 A1 | 5/2020 |
| WO | WO 2020/201299 A1 | 10/2020 |
| WO | WO 2021/030693 A2 | 2/2021 |
| WO | WO 2021/054894 A1 | 3/2021 |
| WO | WO 2021/067978 A1 | 4/2021 |
| WO | WO 2021/165545 A1 | 8/2021 |

OTHER PUBLICATIONS

Das, S. et al., "Selective Laser Sintering of High Performance High Temperature Materials", Laboratory for Freeform Fabrication, University of Texas at Austin, 1996, pp. 89-96.

Ohashi, T. et al., "Fastenerless-Riveting Utilizing Friction Stir Forming for Dissimilar Materials Joining", Key Engineering Materials, Aug. 2017, ISSN: 1662-9795, vol. 751, pp. 186-191, doi: 10.4028/www.scientific.net/KEM.751.186.

Miedzinski Mattias, "Materials for Additive Manufacturing by Direct Energy Deposition", Chalmers University of Technology

(56) References Cited

OTHER PUBLICATIONS

Master's Thesis in Materials Engineering, 2017, http://publications.lib.chalmers.se/records/fulltext/253822/253822.pdf.

Mahmood. M, et al. "Metal Matrix Composites Synthesized by Laser-Melting Deposition: A Review", MDPI.com/journal/materials-Materials, 2020, vol. 13, 02593. htttps://www.mdpi.com/1996-1944/13/11/2593.

Davis, "Theoretical Analysis of Transpiration Cooling of a Liquid Rocket Thrust Chamber Wall", 2006, Theses—Embry-Riddle Aeronautical University, Daytona Beach, Florida, 103 pages.

Ohashi, T. et al., "Pseudo linear joining for dissimilar materials utilizing punching and Friction Stir Forming", Procedia Manufacturing, 2020, vol. 50, pp. 98-103.

Russell et al. "Performance Improvement of Friction Stir Welds by Better Surface Finish", George C. Marshall Space Flight Center Research and Technology Report 2014, 2 Pages, Jan. 1, 2015.

Wagner, J et al. "Method for Fabricating Metallic Panels with Deep Stiffener Sections" https://www.techbriefs.com/component/content/article/23860-lar-17976-1, Feb. 1, 2016, 5 pages.

Carter, RW et al. "Robotic Manufacturing of 18 ft. (5.5mm) Diameter Cryogenic Fuel Tank Dome Assemblies for the NASA Ares I Rocket", TWI 9th International Symposium on Friction Stir Welding 2012, May 15, 2012, 25 pages.

Zhao et al. "Interfacial Bonding Features of Friction Stir Additive Manufactured Build for 2195-T8 Aluminum-Lithium Alloy" Journal of Manufacturing Processes 38, Jan. 2019, 15 pages.

Li et al, "Cold Spray+ as New Hybrid Additive Manufacturing Technology: A Literature Review" Science and Technology of Welding and Joining, 24(5), Apr. 15, 2019, pp. 420-445.

Khodabakhshi et al., "Surface Modification of a Cold Gas Dynamic Spray-deposited Titanium Coating on Aluminum Alloy by Using Friction-Stir Processing" Journal of Thermal Spray Technology, vol. 28, Aug. 2019, pp. 1185-1198.

Wang et al. "High Performance Bulk Pure Al Prepared Through Cold Spray-friction Stir Processing Compositive Additive Manufacturing" Journal of Materials Research and Technology, 9(4), Jun. 2020, pp. 9073-9079.

Zhao et al. "Influence of Tool Shape and Process on Formation and Defects of Friction Stir Additive Manufactured Build" Journal of Materials Engineering, vol. 47 Issue 9, Sep. 2019, pp. 84-92.

\* cited by examiner

FRICTION STIR WELDING SYSTEMS AND METHODS

CROSS-REFERENCE TO RELATED APPLICATION

This is a divisional application of U.S. application Ser. No. 17/386,190, filed Jul. 27, 2021, which claims priority and benefit from U.S. Provisional Application No. 63/058,341, filed Jul. 29, 2020, the contents of which are herein incorporated by reference in its entirety.

BACKGROUND

Friction stir welding is one notable way for components to be joined together, particularly in industrial and manufacturing applications. Unlike traditional welding, friction stir welding does not melt the materials to join them together but instead physically intermixes the two materials together. The mixing occurs at a temperature lower than the melting point of the joined materials so that the joined materials are not unduly heated during the friction stir welding process. Excessive heating of the materials can adversely affect the properties of the materials and cause the materials to warp, form defects, or deform along the weld.

Even though the materials are not heated to their melting point during the friction stir welding process, the action of mixing the materials and the heat generated during the process can cause imperfections or defects in the materials along the weld line, such as oxides or other impurities. These impurities weaken the weld and the area around it. This weakness can make the weld and the area around it susceptible to mechanical failure. In critical situations such as aerospace components, the susceptibility to mechanical failure due to imperfections or impurities in a weld is unacceptable.

Conventional systems identify the imperfections or impurities caused by friction stir welding after the weld is complete. When the imperfections or impurities are found, the materials are discarded and the friction stir welding process must be redone with new materials, which is expensive and time-consuming but necessary for critical applications like welding aerospace components where human safety is paramount.

Further, while oxides are formed in most types of material during the friction stir welding process, the composition of some materials like aluminum or aluminum alloys that are often used for industrial and manufacturing applications like aerospace components can increase the likelihood or impact of such oxide formation. These compositions can lead to increased brittleness of the weld and ultimately higher failure rates than other materials. In materials that are prone to oxide formation or that are adversely affected by oxide formation, the weld may be more likely to fail a quality control inspection and require re-manufacturing of the part, which is expensive and inefficient Therefore, there exists a need for friction stir welding systems and methods that minimize the likelihood of oxide formation in materials and allow materials susceptible to oxide formation to be efficiently and effectively friction stir welded.

DETAILED DESCRIPTION

Figure 1:
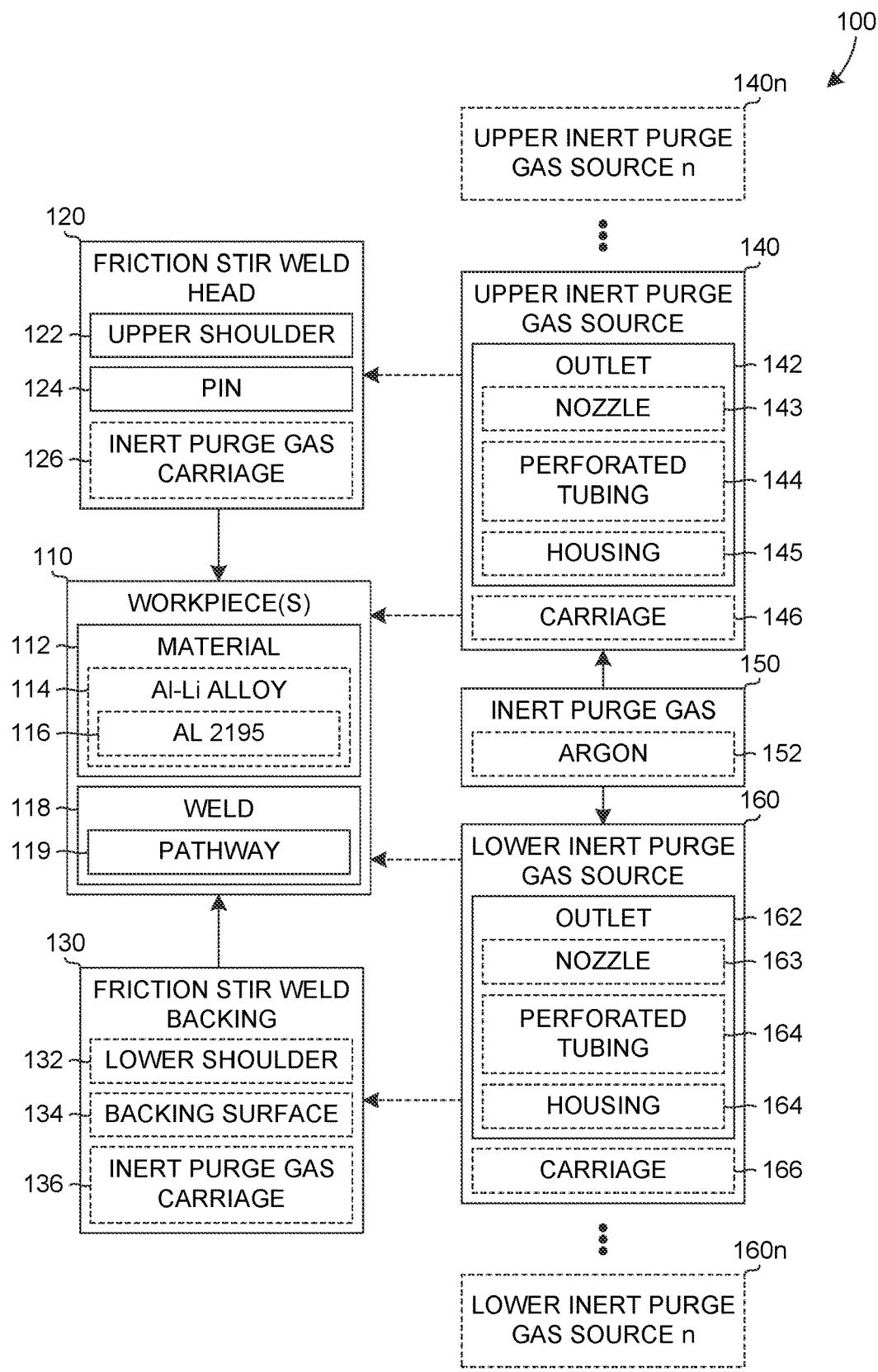
FIG. 1 is a block diagram of an example friction stir welding system.

Friction stir welding systems and methods that perform a friction stir welding process in an inert gas purge atmosphere are described herein. During the friction stir welding process, two or more work pieces are joined together along a pathway that passes between the work pieces. A friction stir weld head moves along this pathway while exerting pressure against the work pieces and while rotating a pin that passes between the work pieces along the pathway. A friction stir weld backing is positioned against a side of the work pieces opposite the friction stir weld head. The frictions stir weld backing counters the pressure exerted by the friction stir weld head so that the work pieces are compressed between the friction stir weld head and the friction stir weld backing.

The friction stir weld head moves along the pathway to weld the work pieces together. To form the weld, the pieces are heated by friction from the pressure exerted by the friction stir weld head and the rotation of the pin. Heating the work pieces softens or makes the work pieces more malleable but does not melt the material. As the rotating pin is moved through the work pieces along the pathway, the rotation of the pin physically intermixes the softened work pieces together to form the weld. An advantage of this friction stir welding process is that the work pieces are not heated to a melting point (which can change the material properties), additional materials are not added to the weld and the weld can be formed so that it is flush with the surfaces of the work pieces on either side of the pathway.

An inert purge gas atmosphere is formed about at least a portion of the pathway by directing inert purge gas towards the pathway from an inert purge gas source. The inert purge gas atmosphere has a reduced concentration of oxygen in comparison to the normal or ambient atmosphere about the work pieces. By performing the friction stir welding process in a reduced oxygen environment, the likelihood of oxide formation in the weld is reduced. Oxides formed in the weld reduce the strength of the weld and can make the weld more prone to failure. Such a low quality weld cause safety hazards and increase the manufacturing expense. For example, a part may need to be remade multiple times to achieve the desired quality of weld or low quality welded parts may mistakenly be put into use where they present a safety hazard to users. As such, the reduction in oxide formation due to the inert gas atmosphere helps create high quality friction stir welds between work pieces.

The friction stir welding systems can include multiple inert purge gas sources that direct inert purge gas towards both the upper and lower surfaces of the work pieces about where the friction stir weld is being formed by the friction stir weld head. The likelihood of oxide formation is further reduced as the portion of the work pieces being welded is substantially surrounded by inert purge gas because the inert gas forces oxygen away from the welded surfaces and reduces the likelihood that oxides can form along those surfaces at various points along the weld. Alternatively, the inert purge gas atmosphere can be formed around one of the upper and lower surfaces of the work pieces about where the friction stir weld is being formed. For example, the an inert purge gas source can direct inert purge gas towards the friction stir weld head where the work pieces are more likely to experience oxide formation as a result of the friction stir welding process.

The inert purge gas source can include various outlets to direct or contain the inert purge gas about the pathway where the friction stir weld is being formed. For example, the inert purge gas source can include a nozzle that directs inert purge gas towards the friction stir weld head and the forming friction stir weld. In another example, a housing can be used to contain the inert purge gas about the friction stir weld. The inert gas can be directed both above and below the friction stir weld, both on the same and the opposing side from the weld head. The inert gas source can be a single source or could include multiple sources or multiple outlets from a single source, each directed towards the weld head, the friction stir weld, or both. In an embodiment in which multiple inert purge gas sources direct inert purge gas both above and below the weld pathway (on the same side and the opposing side from the weld head), a housing can be included about the upper and lower portions to optimize the inert purge gas atmosphere around the weld.

The inert purge gas source can be stationary or could move with the friction stir weld head during the friction stir welding process. To maintain the inert purge gas atmosphere about the forming friction stir weld, the inert purge gas source can include a carriage that moves the inert purge gas source along the pathway so that the inert purge gas atmosphere is maintained where the friction stir weld is being formed. Alternatively, the friction stir weld head can include a carriage to which the inert purge gas source can be coupled so that the inert purge gas source is moved with the friction stir weld head during the friction stir welding process. In a further alternative, the inert purge gas source can be substantially stationary relative to the friction stir weld head. For example, the inert purge gas source can be arranged about a portion of the pathway and can direct inert purge gas about this portion of the pathway. The friction stir weld head can traverse the portion of the pathway while the inert purge gas is being dispensed so that the friction stir weld formed along the portion of the pathway is formed in an inert purge gas atmosphere. The inert purge gas source can extend along the entire length of the pathway to form the inert purge gas atmosphere, or the inert purge gas source can be moved to a subsequent portion of the pathway so that the inert purge gas atmosphere is maintained as the friction stir weld head traverses along the pathway.

Depending on the materials of the work pieces, such as their physical and chemical properties, various parameters of the friction stir welding process can be varied. Example parameters can include a rotational speed of the friction stir weld head and a traverse speed of the friction stir weld head along the pathway between the work pieces. The materials can have tolerances associated with the various parameters of the friction stir welding process, such as a range of appropriate rotational and traverse speeds that form a high quality weld between the work pieces. For example, some materials may have a wide range of rotational and traverse speeds that can be used when friction stir welding and other materials may have narrower acceptable ranges of rotational and traverse speeds that can be used to achieve a similar quality of friction stir weld. For materials having smaller or reduced tolerances for the friction stir welding process, the use of the inert gas atmosphere can expand the operating tolerances while maintaining the quality of the weld. Since performing the friction stir weld in an inert gas atmosphere can reduce imperfections, such as oxide formation, in the weld, the operating parameters of the friction stir welding process can be expanded while maintaining a similar or reduced level of imperfections with respect to forming the weld in a normal environment. The expansion of the operating parameters can reduce the precision needed during the friction stir welding process and can allow for a higher output of friction stir welding, such as by increasing the allowable traverse speed of the friction stir weld head. In this manner, the efficiency of the friction stir welding process can be increased due to performing the friction stir welding process in an inert gas atmosphere.

Additionally, some materials may have such a reduced or low amount of workability, i.e. such low tolerances or such a high likelihood of oxide formation, that a normal friction stir welding process is not able to create welds of consistent or acceptable quality. The use of the inert gas atmosphere can allow such materials to be friction stir welded. For example, aluminum alloys having a high lithium content, such as 0.5% or greater lithium content, can have desired properties for aerospace applications like building rockets that require critical levels of safety against component failures. Aluminum alloys are attractive in building such components because they offer a high strength to weight ratio, but they have a low workability that makes them unsuitable for friction stir welding. Using friction stir welding systems and methods described herein, high lithium content, aluminum alloys can be successfully friction stir welded together in a consistent and high quality manner. Similarly, other materials having low workability can also be successfully joined by performing the friction stir welding process in an inert gas atmosphere, as described below.

FIG. 1 illustrates an example friction stir welding system 100 that can be used to weld work pieces 110 together along pathway 119 to form a weld 118 having reduced oxide formation. An upper inert gas source 140 and, optionally, a lower inert gas source 160 supply inert gas about the pathway 119 of the weld 118 to provide a reduced oxygen atmosphere in which the frictions stir welding process occurs. The reduced oxygen about the pathway 119 reduces or prevents the formation of oxides along the pathway 119 due to the mechanical action and heat generated by the friction stir welding process. Additionally, performing the friction stir welding process in the reduced oxygen environment can expand the operating parameters of the friction stir welding process, reducing the complexity of the process and increasing the efficiency of the process.

The work pieces 110 are the pieces of material 112 that are to be welded 118 together along the pathway 119. The work pieces 110 are arranged so that they contact or about each other along respective sides of the work pieces 110 and the point of contact is the pathway 119 between the work pieces 110. The friction stir welding process occurs along the pathway 119 to form the weld 118 that joins the work pieces 110 together. To maintain contact between the work pieces 110, the work pieces 110 can be placed in a jig or fixture that orients and arranges the work pieces 110 properly for the friction stir welding process.

The material 112 of the work pieces 110 can effect various parameters of the friction stir welding process. For example, the chemical composition of the material 112, the mechanical properties of the material 112, other attributes of the material 112, or combinations thereof, can be used to determine a rotational speed, a traverse speed, or other parameters of the friction stir welding process. Additionally, the tolerances of these parameters, i.e. how much the parameter can vary from a set amount, can be dependent on the materials 112. Certain materials 112 may have large tolerances, such as allowing a wide range of rotational and traverse speeds to be used during the friction stir welding process while maintaining a desired or required quality of the weld 118. Other materials can have tighter tolerances, such as allowing a narrow range of rotational and traverse speeds to be used during the friction stir welding process while maintaining a desired or required quality of the weld 118. The quality of the weld 118 can include a tolerated amount of defects or impurities in the weld, as these may weaken the weld 118.

A friction stir weld head 120 and a friction stir weld backing 130 are positioned on opposing sides of the work pieces 110 and engage the work pieces 110. The friction stir weld head 120 engages first or upper surfaces of the work pieces 110 and the friction stir weld backing 130 engages second or lower surfaces of the work pieces 110. In this manner, the work pieces 110 are positioned between the friction stir weld head 120 and the friction stir weld backing 130. The friction stir weld head 120 and the friction stir weld backing 130 are positioned to align with the pathway 119, where the work pieces 110 abut or contact each other. During the friction stir welding process, the friction stir weld head 120 and, optionally, the friction stir weld backing 130 move along the pathway 119 to form the weld 118 that joins the work pieces 110 along the pathway 119.

The friction stir weld head 120 includes an upper shoulder 122 and a pin 124 that are rotated during the friction stir welding process. The upper shoulder 122 is a portion of the friction stir weld head 120 that contacts and exerts pressure on the upper surfaces of the work pieces 110. The exertion of pressure on the upper surfaces of the work pieces 110 compresses the lower surfaces of the work pieces 110 against the friction stir weld backing 130. This compression of the work pieces 110 assists with generating the friction of the frictions stir welding process. Additionally, this compression prevents deformation of the materials along the weld 118, creating a weld 118 that is flush with the upper and lower surface of the work pieces 110.

The upper shoulder 122 is circularly shaped and has a diameter. The diameter of the upper shoulder 122 extends across portions of the work pieces 110 on either side of the pathway 119 of the weld 118. During the friction stir welding process, the upper shoulder 122 is translated along the pathway 119 and across the upper surfaces of the work pieces 110, which compresses the work pieces 110 against the friction stir weld backing 130. The pressure exerted by the upper shoulder 122 on the work pieces 110 can be varied, such as depending on the material 112 being joined, desired mechanical properties of the weld 118 between the work pieces 110, other considerations, or combinations thereof.

A pin 124 of the friction stir weld head 120 is positioned concentric to the upper shoulder 122 and extends a length from the upper shoulder 122. The length the pin 124 extends from the upper shoulder 122 is the depth to which the pin 124 will engage the work pieces 110. The pin can be releasably coupled to the friction stir weld head 120 to allow the length and shape of the pin 124 to be varied. Varying the length of the pin 124 changes the depth to which the pin 124 engages the work pieces 110. This can alter various properties of the weld 118 and the length of the pin 124 can be selected based on the materials 112, the desired properties of the weld 188, other considerations, or combinations thereof.

For example, the pin 124 can extend partially through the thickness of the work pieces 110, which welds 118 a portion of the thickness of the work pieces 110 along the pathway 119. In another example, the pin 124 can extend substantially through the thickness of the work pieces 110, which welds 118 substantially the entire thickness of the work pieces 110 along the pathway 119. As previously mentions, the pin 124 has a shape which can also effect various properties of the weld 188. In an example, the pin 124 can have a cylindrical, conical or other shape. The shape of the pin 124 can be selected based on various considerations, such as the material 112 of the work pieces 110, the desired properties of the weld 118, other considerations, or combinations thereof.

In the example shown in FIG. 1, the friction stir weld backing 130 is positioned against the work pieces 110, opposing the friction stir weld head 120. The friction stir weld backing 130 can counter the pressure exerted on the work pieces 110 by the friction stir weld head 120 or can assist with compressing the work pieces 110 between the friction stir weld head 120 and the friction stir weld backing 120. In an example, the friction stir weld backing 130 can be a lower shoulder 132. The lower shoulder 132 can be coupled to the friction stir weld head 120 so that it moves with the friction stir weld head 120 as it is translated along the pathway 119. To couple the lower shoulder 132 to the friction stir weld head 120, the lower shoulder 132 can be coupled to the pin 124 that extends through the thickness of the work pieces 110. The lower shoulder 132 can rotate with the pin 124 during the friction stir welding process due to the coupled nature of the lower shoulder 132 and the pin 124. Alternatively, a portion of the lower shoulder 132 can rotate with the pin 124 during the friction stir welding process while another portion of the lower shoulder 132 does not rotate with the pin 124. The coupling between the friction stir weld head 120 and the lower shoulder 132 can be adjustable to allow the compression of the work pieces 110 to be varied. The compression of the work pieces 110 can be varied based on a variety of considerations, such as the materials 112 being joined, the properties of the weld 118, other considerations, or combinations thereof.

In another example, the friction stir weld backing 130 can be a backing surface 134. The backing surface 134 can remain stationary during the friction stir welding process and can support the lower surfaces of the work pieces 110 along the pathway 118. The friction stir weld head 120 can exert pressure on the work pieces 110, compressing them between the friction stir weld head 120 and the backing surface 134. Unlike the lower shoulder 132, the backing surface 134 does not need to be coupled to the friction stir weld head 120, so the pin 124 does not need to extend through the thickness of the work pieces 110. This can allow the weld 118 to be a partial thickness weld that does not extend through the entire thickness of the work pieces 110. Alternatively, the backing surface 134 can be used with a pin 124 that extends substantially through the thickness of the work pieces 110 to create a full thickness weld 118 that extends from the upper surfaces of the work pieces 110 to the lower surfaces of the work pieces 110, or substantially thereto.

During the friction stir welding process, the upper shoulder 120 and the pin 124 of the friction stir weld head 120 are rotated and the rotating upper shoulder 12 and pin 124 are translated along the pathway 119 to form the weld 118 that joins work pieces 110 together. The compression of the work pieces 110 between the friction stir weld head 120 and the friction stir weld backing 130 generates friction, which heats the work pieces 110 about where the friction stir weld head 120 contacts the work pieces. The generated heat from the applied friction softens, but does not melt the material 112 of the work pieces 110. No other heat source is applied to the materials during the welding process. The rotating pin 124 moves along the pathway 119 where the work pieces 110 contact each other. As the rotating pin 124 moves through the softened material 112 of the work pieces 110, the rotation of the pin 124 causes the material 112 of the work pieces 110 to be intermixed. This intermixing physically mixes the material 112 of the work pieces 110 together about the pathway 119, which forms the weld 118 that joins the work pieces 110. As the friction stir weld head 120 passes through the work pieces 110 and intermixes them along the pathway 119, the formed weld 118 quickly cools since the friction stir weld head 120 is no longer contacting that portion of the work pieces 110. This quick cooling limits deformation of the work pieces 110 along the weld 118 and results in a butt weld that is flush with the upper and lower surfaces of the work pieces 110.

As part of the parameters of the friction stir welding process, the speed of rotation of the pin 124, the speed of translation of the pin 124 and upper shoulder 122 along the pathway 119 and the compression of the work pieces 110 along the pathway 119 can be varied. Various parameters, such as these, can be altered or changed depending on factors, such as the materials 112 being joined, the desired mechanical properties of the weld 118, a desired quality of the weld 118, other considerations, or combinations thereof.

Certain materials 112 may be more prone to form defects or impurities, such as the formation of oxides, in the weld 118 during the friction stir welding process. Such defects or impurities can create a weak weld 118 that may be prone to failure, such as forming brittle welds or materials surrounding the welds that crack and break easier than the material otherwise would fail without the defects. In an example, high lithium content aluminum-lithium (Al—Li) alloys 114 can be prone to form oxides and are conventionally unsuitable for friction stir welding as there is a high likelihood the weld 118 will have such defects and be prone to failure. The benefit of high lithium content Al—Li alloys 114, such as alloys containing at least 0.5% lithium, is that they have desirable properties, such as having a high strength to weight ratio. Example Al—Li alloys 114 include AL 2195 116, AL 2050, AL 2090. However, the high lithium content of the Al—Li alloys 114 causes the alloys to have a low workability making them difficult to join together and increasing a likelihood of forming a low quality weld 118 due to the formation of oxides in the weld 118. The friction stir welding system 100 includes inert gas sources 140 and 160 that form an inert gas atmosphere about the pathway 119 where the weld 118 is being formed by the friction stir weld head 120. The inert gas atmosphere has a reduced level of oxygen which reduces the formation of oxides in the weld 118, allowing high lithium content Al—Li alloys 114, such as AL 2195 116, to be joined using a friction stir welding process that forms a high quality weld 118.

As discussed, materials 112 may have varying tolerances to the rotational speed of the pin 124 and upper shoulder 122 and the traverse speed of the friction stir weld head 120 along the pathway 119. The inert gas atmosphere about weld 118 being formed by the friction stir weld head 120 can expand these operating tolerances while maintaining the same quality of the weld 118. For example, a certain material 112 may have a fairly narrow range of suitable traverse speed at which the friction stir weld head 120 may be moved along the pathway 119, such as ±2 mm/min. Using the inert gas atmosphere, the suitable range of the traverse speed can be ±8 mm/min, while maintaining a weld 118 quality that is at least similar to the suitable traverse speed in a normal atmosphere. The expanded operating tolerances of the friction stir welding process using the inert gas atmosphere can increase the speed and reduce the complexity or precision of the friction stir welding process.

To form the inert gas atmosphere, an inert purge gas 150, such as argon 152, can be dispensed about the pathway 119 where the weld 118 is being formed by the friction stir weld head 120. The inert purge gas 150 is a non-reactive gas that has a greater density than the normal atmosphere so that it displaces the normal atmosphere about the pathway 119. Additionally, the inert gas atmosphere remains about the pathway 119 for a period of time since the density of the inert purge gas 150 slows its dissipation from about the pathway 119. For example, argon 152 has a high density and low reactivity that allow it to form an inert gas atmosphere about the pathway 119. Other gases having a high density and low reactivity, such as nitrogen, carbon dioxide, can be used to form the inert gas atmosphere about the pathway 119. The selection of the inert purge gas 150 can also be dependent on the materials 112 being used and their reactivity with the inert purge gas 150. A combination of inert purge gas 150 and materials 112 having a low reactivity assists in minimizing the formation of defects or impurities in the weld 118.

The inert gas atmosphere about the pathway 119 can be formed by dispensing the inert purge gas 150 from one or both of the upper inert purge gas source 140 and the lower inert purge gas source 160. The upper inert purge gas source 140 dispenses the inert purge gas 150 about the upper surfaces of the work pieces 110 along the pathway 119. Similarly, the lower inert purge gas source 160 dispenses the inert purge gas 150 about the lower surfaces of the work pieces 110 along the pathway 119. In this arrangement, the weld 118 is formed in an inert gas atmosphere which assists in creating a high quality weld 118 and assisting with minimizing the formation of impurities in the weld 118.

The upper inert purge gas source 140 is in fluid communication with a source of the inert purge gas 150. Inert purge gas 150 from the inert purge gas source is directed through an outlet 142 of the upper inert purge gas source 140. The inert purge gas 150 flows from the outlet 142 and about at least a portion of the weld 118, a portion of the pathway 119, another portion of the friction stir welding system 100, or a combination thereof. The outlet can be positioned near the friction stir weld head 120 and can be oriented to direct the inert purge gas 150 towards the weld 118, a the pathway 119, another portion of the friction stir welding system 100, or a combination thereof. For example, the outlet 142 can be positioned away from the upper surfaces of the work pieces 110 and at an angle relative to the work pieces 110, such as angled downwards towards weld 118 or pathway 119. In another example, the outlet 142 can be angled relative to the friction stir weld head 120, such as to direct inert purge gas towards pathway 119 ahead of the friction stir weld head 120 or to direct inert purge gas towards the formed weld 118 immediately behind the friction stir weld head 120. Alternatively, the outlet 142 can be angled relative to both the work pieces 110 and the friction stir weld head 120.

The size and profile of the outlet 142 can be selected to assist with dispensing the inert purge gas 150 from the upper inert purge gas source 140. For example, the outlet 142 can be sized so that a desired or required amount of inert purge gas 150 per unit time is dispensed from the outlet, the outlet 142 can be shaped to prevent mixing of the dispensed inert purge gas 150 with the surrounding environment, other considerations regarding the dispensing of the inert purge gas 150 from the upper inert purge gas source 140, or combinations thereof. Additionally, the upper inert purge gas source 140 can include a flow regulating device or system to control the rate at which inert purge gas 150 is dispensed through the outlet 142. The flow rate of the inert purge gas 150 from the upper inert purge gas source 140 can be preset before the friction stir welding process begins or can vary as the friction stir welding process progresses. In this manner, the flow of the inert purge gas 150 can be controlled to assist in maintaining the inert purge gas atmosphere during the friction stir welding process.

An example outlet 142 of the upper inert purge gas source 140 can include a nozzle 143 having one or more openings through which inert purge gas 150 can be dispensed. The nozzle 143 can be fixedly or adjustably mounted. In the fixed embodiment, the nozzle 143 can have a fixed position and orientation, such as relative to the pathway 119 or friction stir weld head 120. In the adjustably mounted embodiment, the position, orientation, or both of the nozzle 143 can be adjusted. This can allow the nozzle 143 to be positioned closer or further from the pathway 119, the upper shoulder 122, the upper surfaces of the work pieces 110, or other portions of the friction stir welding system 100. Additionally, the orientation of the nozzle 143 can be adjustable to allow the dispensed inert purge gas 150 to be directed in a controlled manner. For example, the nozzle 143 can be oriented so that the inert purge gas 150 is dispensed towards the leading side of the friction stir weld head 120. In this manner, the inert purge gas atmosphere can be formed slightly ahead of the friction stir weld head 120 so that the friction stir welding performed by the upper shoulder 122 and pin 124 occurs in the inert purge gas atmosphere. The adjustable nozzle 143 can be manually adjustable or adjustable automatically or remotely. This can allow the position, orientation, or both of the nozzle 143 to be varied during the friction stir welding process. The variable adjustability may be desirable during friction stir welding processes that occur along a curved pathway 119, so that the inert purge gas atmosphere can be more efficiently formed about the forming weld 118.

In another example, the outlet 142 of the upper inert purge gas source 140 can include a perforated tubing 144. The perforated tubing 144 can be circular tubing that has a series of openings disposed only its length. The inert purge gas 150 can be dispensed through the openings of the perforated tubing 144 and the perforated tubing 144 can be positioned and oriented to generate the inert purge gas atmosphere for the friction stir welding process. For example, the perforated tubing 144 can be placed along the upper surface of a work piece 110 so that the perforated tubing 144 is proximal or near the pathway 119. The perforated tubing 144 can be oriented to that the openings of the perforated tubing 144 direct or dispense the inert purge gas 150 towards the pathway 119 to create an inert purge gas atmosphere about the forming weld 118.

The perforated tubing 144 can be flexible or rigid. Flexible perforated tubing 144 can be arranged on or near the work pieces 110 to follow the pathway 119 so that the weld 118 formed by the friction stir weld head 120 is formed in an inert purge gas atmosphere. A user can arrange the flexible perforated tubing 144 prior to the friction stir welding process or can move the perforated tubing 144 as the friction stir welding process is ongoing so that the inert purge gas atmosphere is maintained about the forming weld 118. Rigid perforated tubing 144 can be similarly arranged but may require bending or joining to follow a non-linear pathway 119. In an example, the work pieces 110 can be held in a jig or fixture during the friction stir welding process and the perforated tubing 144 can be integrated with or coupled to the jig or fixture.

As discussed, the inert purge gas 150 flows through the openings of the perforated tubing 144 to form the inert purge gas atmosphere. The perforated tubing 144 can include flow control features, such as baffles, to assist with maintaining a substantially constant flow rate of inert purge gas 150 from the openings of the perforated tubing 144. Additionally, the size and shape of the openings of the perforated tubing 144 can be varied along the length of the perforated tubing 144 to assist with maintaining a steady flow rate of inert purge gas 150 from the perforated tubing 144.

In another example, the outlet 142 can include a housing 145 that assists with containing the inert purge gas 150 about an area. For example, the housing 145 can be positioned about the pathway 119 and inert purge gas 150 can be dispensed or flowed into the housing 145 to form the inert purge gas atmosphere. The friction stir weld head 120 can then move through the housing as it traverses along the pathway 119, so that the weld 118 is formed in the inert purge gas atmosphere. In an embodiment, the housing 145 can be a temporary structure, such as made of a frangible material that breaks apart as the friction stir weld head 120 traverses along the pathway 119. As the friction stir weld head 120 traverses along the pathway 119, the temporary housing 145 does not impede it and is instead destroyed or moved to allow the friction stir weld head 120 to progress. Also, during the friction stir welding process, the inert purge gas 150 can be flowed continuously into the housing 145 to maintain the inert purge gas atmosphere within the housing 145 and about the forming weld 118.

The upper inert purge gas source 140 can also include a carriage 146 that can move the upper inert purge gas source 140 during the friction stir welding process. The carriage 146 can be a device or system that moves the upper inert purge gas source 140, such as along the pathway 119 during the friction stir welding process to assist with maintaining the inert purge gas atmosphere about the forming weld 118. The carriage 146 can move or be moved as the friction stir welding process is occurring so that the upper inert purge gas source 140 is similarly moved. In this manner, the upper inert purge gas source 140 can move in a synchronized manner with the friction stir weld head 120 to maintain the inert purge gas atmosphere.

In an embodiment, a user can move the carriage 146 or can cause the carriage 146 to be moved, such as by using a control system. The user can reposition the carriage 146 at intervals so the upper inert purge gas source 140 is positioned to form the inert purge gas atmosphere about the forming weld 118. For example, the upper inert purge gas source 140 can have an outlet 142 that is perforated tubing 144 having a first length. When the friction stir weld head 120 is near a first end of the perforated tubing 144, the user can move the carriage 146 so that a second end of the perforated tubing 144 is then near the friction stir weld head 120. As the friction stir weld head 120 continues traversing along the pathway 119, the user can repeat the process to move the carriage 146 and reposition the perforated tubing 144. Alternatively, the user upper inert purge gas source 140 does not include the carriage 146 and the user can manually reposition the perforated tubing 144 as needed.

In another embodiment, the movement of the carriage 146 can be controlled by a control system that can move the carriage 146 as needed. For example, the carriage 146 can be a robotic arm that moves the upper inert purge gas source 140 or a portion thereof, such as the outlet 142. Alternatively, the upper inert purge gas source 140 or a portion thereof, can be mounted to the robotic arm so that it moves with the robotic arm. As the friction stir welding process occurs, the robotic arm can reposition or move the upper inert purge gas source 140, or a portion thereof, to maintain the inert purge gas atmosphere about the forming weld 188.

Alternatively, the friction stir weld head 120 can include an inert purge gas carriage 126 that moves the upper inert purge gas source 140, or a portion thereof. In this manner, the upper inert purge gas source 140, or a portion thereof, is moved with the friction stir weld head 120 as it traverses along the pathway 119. Since the upper inert purge gas source 140 is moved with the friction stir weld head 120, the inert purge gas atmosphere can be maintained about the forming weld 118. The inert purge gas carriage 126 can be an interface of the friction stir weld head 120 to which the upper inert purge gas source 140, or a portion thereof, can be mounted.

The friction stir welding system 100 can also include a lower inert purge gas source 160 that assists in forming an inert purge gas atmosphere about pathway 119 on the lower surfaces of the work pieces 110. Like the upper inert purge gas source 140, the lower inert purge gas source 160 can include an outlet 162, such as a nozzle 163, perforated tubing 164 or a housing 165, to direct the inert purge gas 150 towards the pathway 119. The lower inert purge gas source 160 can also include a carriage 166 to move the lower inert purge gas source 160, or a portion thereof, along the pathway 119 in a manner similar to the carriage 146 of the upper inert purge gas source 140. Similarly, the friction stir weld backing 130 can include an inert purge gas carriage 136 to move the lower inert purge gas source 160, or a portion thereof, instead the carriage 166 of the lower inert purge gas source 160.

Additionally, the friction stir welding system 100 can include multiple upper inert purge gas sources 140-140*n*, multiple lower inert purge gas sources 160-160*n*, or a combination thereof. The use of multiple inert purge gas sources 140-140*n*, 160-160*n* can assist with forming the inert purge gas atmosphere in which the friction stir welding process occurs to minimize or prevent the formation of oxides in the material 112 of the work pieces 110. In an example, the friction stir welding system 100 can include a multiple upper inert purge gas sources 140-140*n*. A first upper inert purge gas source can be positioned and oriented to dispense or direct inert purge gas 150 towards a leading portion of the friction stir weld head 120. A second upper inter purge gas source can be positioned and oriented to dispense or direct inert purge gas 150 towards a retreating portion of the friction stir weld head 120. In this manner, inert purge gas 150 is dispensed preceding the formation of the weld 118 and after the weld 118 has been formed. This can form an inert purge gas atmosphere in which the weld 118 is formed and cooled, which can assist with minimizing or preventing the formation of oxides in the material 112 of the work pieces 110. Alternatively, the multiple inert purge gas sources 140-140*n*, 160-160*n* can be positioned proximal the work pieces 110 and oriented to direct inert gas towards the pathway 119.

For example, a first upper inert purge gas source 140 can be positioned away from an upper surface of a first work piece 110 and angled to direct the inert purge gas 150 towards the pathway 119. A second upper inert purge gas source 140*n* can be positioned away from an upper surface of a second work piece 110 and also angled to direct the inert purge gas 150 towards the pathway 119. A similar arrangement of multiple lower inert purge gas sources 160-160*n* can also be used. In these arrangements, multiple inert purge gas sources 140-140*n*, 160-160*n* can be positioned on opposing sides of the pathway 119 direct inert purge gas 150 towards the pathway 119. Alternatively, the multiple inert purge gas sources 140-140*n*, 160-160*n* can be positioned on the same side of the pathway 119 and direct inert purge gas towards the same portion of the pathway 119 or weld 118, or towards different portions of the pathway 119 or weld 118. Additionally, the angling of the inert purge gas sources 140-140*n*, 160-160*n* relative to the work pieces 110 can be the same or different. For example, a first inert purge gas source 140, 160 can be angled at a first angle relative to the work pieces 110 and a second inert purge gas source 140*n*, 160*n* can be angled at a second angle relative to the work pieces 110. Alternatively, the multiple inert purge gas sources 140-140*n*, 160-160*n* can be angled at substantially the same angle relative to the work pieces 110.

Figure 2A:
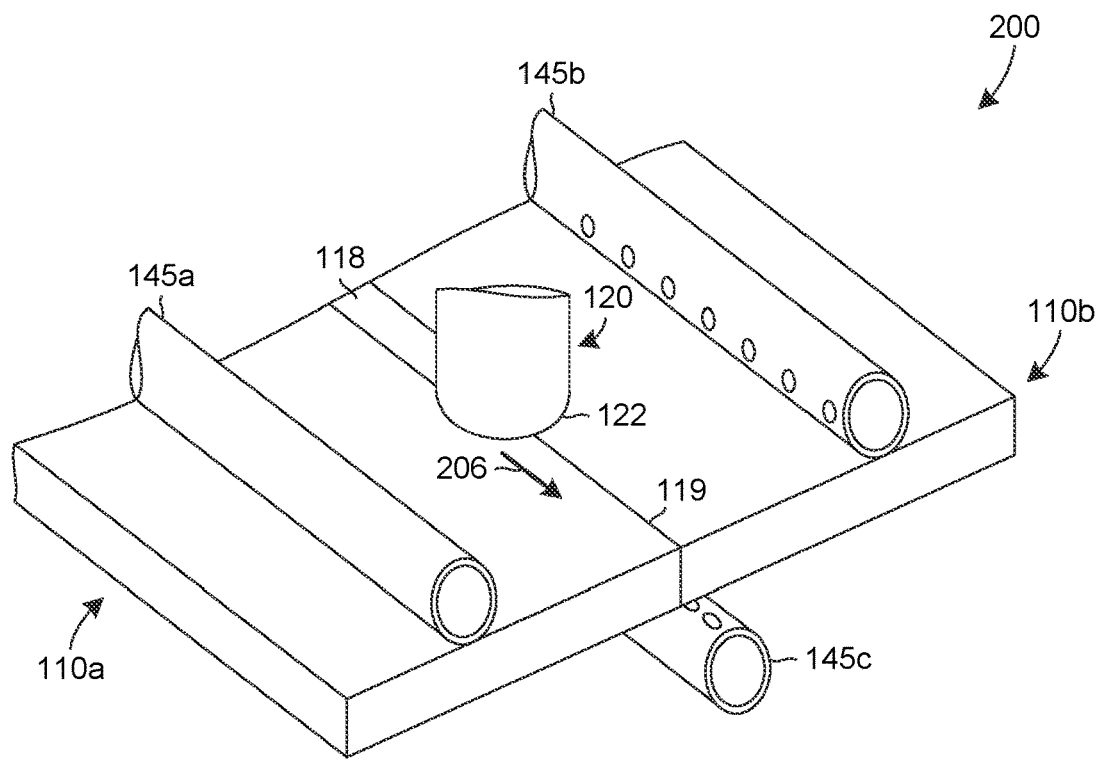
FIG. 2A is a partial perspective view of an example friction stir welding system.
Figure 2B:
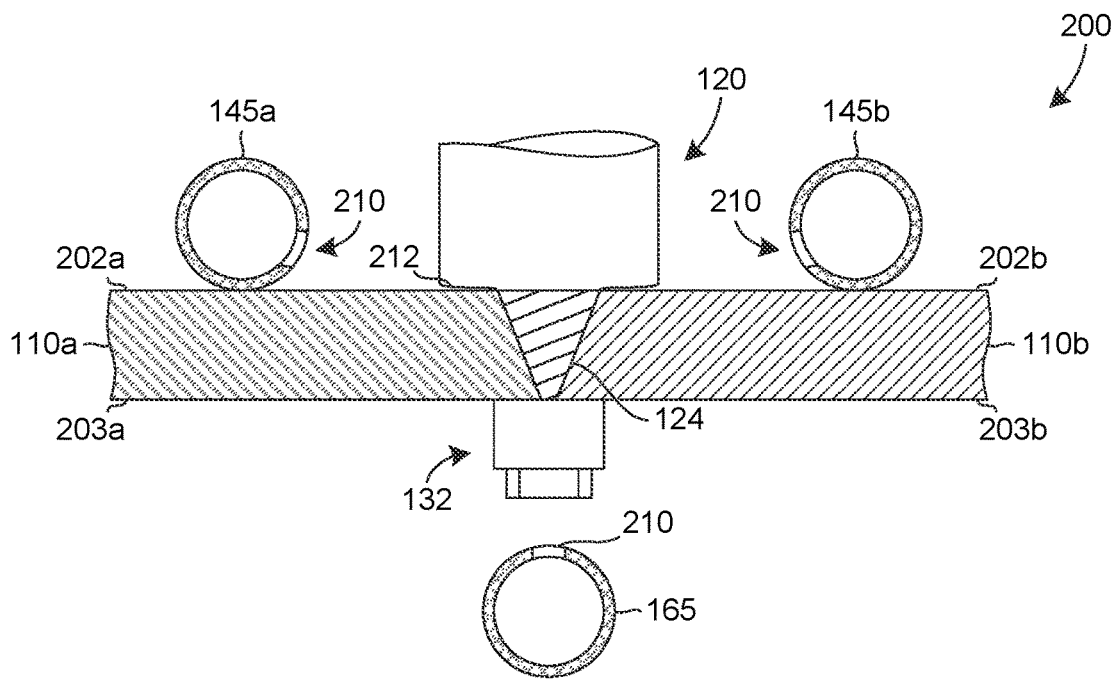
FIG. 2B is a partial cut-away view of the example friction stir welding system of FIG. 2A.

FIG. 2A is a perspective view of an example friction stir welding system 200 and FIG. 2B is a partial cut-away of the friction stir welding system 200. The friction stir welding system 200 includes a friction stir weld head 120 and a friction stir weld backing 130 that are welding two work pieces 110*a*, 110*b* together along a pathway 119. The friction stir welding system 200 also includes two upper inert purge gas sources that have perforated tubing 145*a*, 145*b* outlets and a lower inert purge gas source that has perforated tugging 165. Inert purge gas 150 is dispensed or directed from the perforated tubing 145*a*, 145*b*, 165 to form an inert purge gas atmosphere about the pathway 119. The friction stir welding process by the friction stir weld head 120 and friction stir weld backing 130 occurs in the inert purge gas atmosphere, which assists in minimizing or preventing the formation of oxides in the materials of the work pieces 110*a*, 110*b*, such as in a weld 118.

The friction stir weld head 120 includes an upper shoulder 122 that contacts upper surfaces 202*a* and 202*b* of the work pieces 110*a*, 110*b*. A pin 124 of the frictions stir weld head 120 extends through the thickness of the work pieces 110*a*, 110*b*, from the upper surfaces 202*a*, 202*b* to the lower surfaces 203*a*, 203*b*. A lower shoulder 132 of the friction stir weld backing 130 is coupled to the pin 124 and contacts the lower surfaces 203*a*, 203*b*. During the friction stir welding process, the friction stir weld head 120 exerts pressure on the upper surfaces 202*a*, 202*b* and the friction stir weld backing 130 counters the exerted pressure. Also, during the friction stir welding process, the friction stir weld head 120 rotates and the combination of the pressure on and rotation against the work pieces 110*a*, 110*b* generates friction that heats the work pieces 110*a*, 110*b* below the melting temperature of the materials. The rotation physically mixes portions of the work pieces 110*a*, 110*b* together, forming the weld 118. The friction stir weld head 120 and coupled friction stir weld backing 130 traverse 206 across the work pieces 110*a*, 110*b* along the pathway 119, which joins the work pieces 110*a*, 110*b* together.

To assist with forming a high quality weld 118, such as by minimizing or preventing defects like oxide formation, an inert purge gas atmosphere is formed about the stir weld head 120 and friction stir weld backing 130. The perforated tubing 145*a* and 145*b* are arranged on the upper surfaces 202*a*, 202*b* of the work pieces 110*a*, 110*b* and are positioned near the pathway 119. Openings 210 of the perforated tubing 145*a*, 145*b* are oriented towards the pathway 119 so that inert purge gas is directed towards the pathway 119 and the friction stir weld head 120 to form the inert purge gas atmosphere. The openings 210 can be spaced regularly along the length of the perforated tubing 145a, 145b to direct the inert purge gas evenly along the pathway 119. Alternatively, the spacing, size, shape, or combinations thereof, of the openings 210 can be varied to control the flow of inert purge gas from the perforated tubing 145a, 145b.

The perforated tubing 165 is positioned below the work pieces 110a, 110b near the lower surfaces 203a, 203b. The openings 210 of the perforated tubing 165 are similarly oriented towards the pathway 119 to assist in forming the inert purge gas atmosphere about the pathway 119. In the example shown in FIGS. 2A-2B, the openings 210 of the perforated tubing 165 direct inert purge gas about the friction stir weld backing 130 and form an inert purge gas atmosphere about the lower surfaces 203a, 203b of the work pieces 110a, 110b.

In the example shown in FIGS. 2A-2B, the perforated tubing 145a, 145b, 165 is shown arranged along the pathway 119. The perforated tubing 145a, 145b, 165 can extend along the length of the pathway 119, as shown, or the perforated tubing 145a, 145b, 165 can be segments or sections of perforated tubing that can be moved during the friction stir welding process. For example, the perforated tubing 145a, 145b, 165 can be positioned to extend along a portion of the pathway 119 that is being friction stir welded. When the friction stir welding process nears the end of the portion of the pathway 119, the perforated tubing 145a, 145b, 165 can be moved along the pathway 119 to be positioned along a subsequent section of the pathway 119 along which the friction stir welding process will continue. So instead of having the perforated tubing 145a, 145b, 165 extending along the entire length of the pathway 119, the perforated tubing 145a, 145b, 165 can be repositioned as needed to maintain the inert purge gas atmosphere about where the weld 118 is being formed. The perforated tubing 145a, 145b, 165 can be moved and repositioned manually, such as by a user, or by an automated or controlled process, such as using a carriage. For example, the perforated tubing 145a, 145b, 165 segments can be connected to the friction stir weld head 120 and the friction stir weld backing 130, respectively. As the friction stir weld head 120 and friction stir weld backing 130 traverse 206 along the pathway 119, the segments of perforated tubing 145a, 145b, 165 can be similarly moved along the work pieces 110a, 110b. In this manner, the inert purge gas atmosphere created by the perforated tubing 145a, 145b, 165 also moves with the friction stir welding process as it traverses 206 along the pathway 119.

Figure 3:
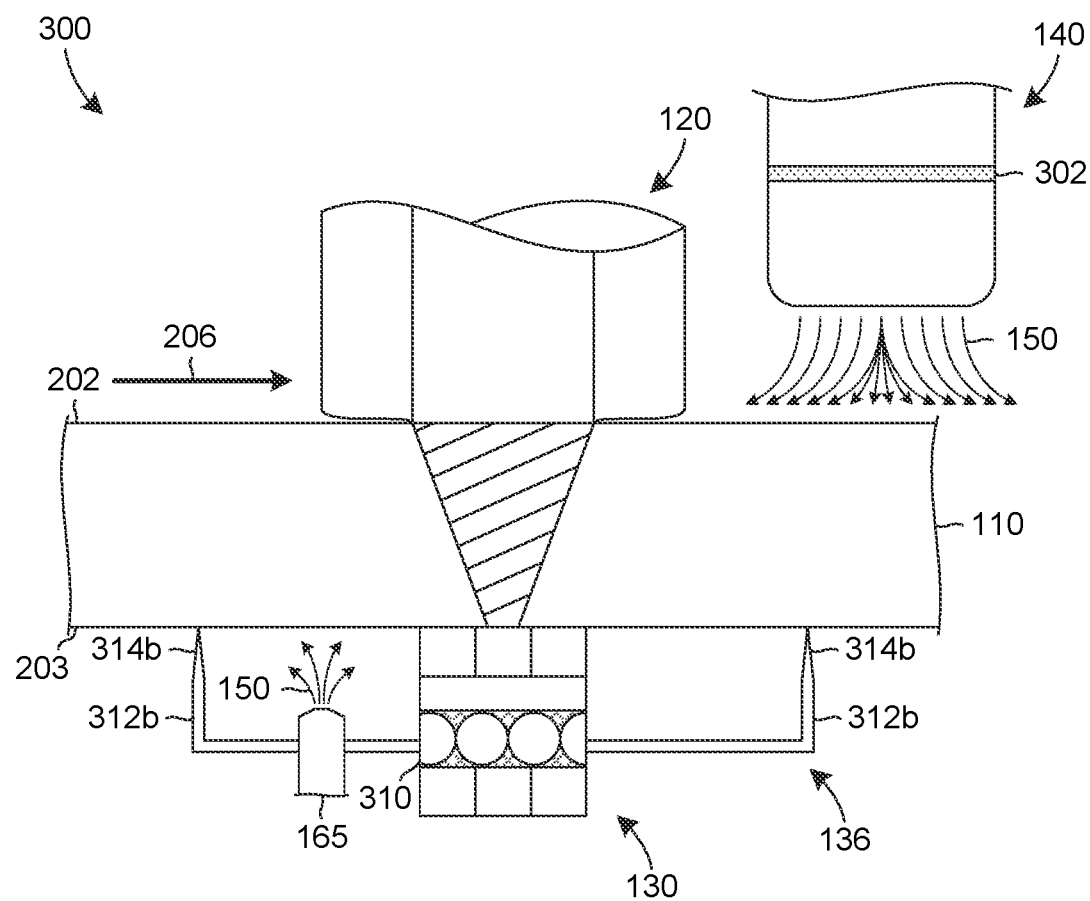
FIG. 3 is a cutaway view of another example friction stir welding system.

FIG. 3 is a cut-away view of an example friction stir welding system 300. In this example, the view is taken looking at the side of a work piece 110 along which a friction stir weld head 120 traverses 206. Similar to the examples of FIGS. 1, and 2A-2B, the friction stir weld head 120 includes an upper shoulder 112 that contacts an upper surface 202 of the work piece 110 and a pin 124 that extends through the work piece 110. The pin 124 is coupled to a friction stir weld backing 130 that includes lower shoulder 132 that contacts a lower surface 203 of the work piece 110. The work piece 110 is compressed between the friction stir weld head 120 and the friction stir weld backing 130. Additionally, the friction stir weld head 120 and backing 130 rotate. The combination of the pressure and rotation generates friction with the work piece 110, heating the work piece 110 along the pathway. The softened material of the work piece 110 is "stirred" by the pin 124 with similar material of another work piece (not shown) to weld the two work pieces together. In the example shown in FIG. 3, the pin 124 has a conical shape with fluting. Alternatively, as discussed above, the pin 124 can have other profiles and features that effect how the weld is formed between two work pieces. The characteristics of the pin 124 can be selected based on a variety of factors, such as the material of the work pieces.

An upper inert gas source 140 is positioned near a leading edge of the friction stir weld head 120 and dispenses inert urge gas 150 ahead of the friction stir weld head 120. In this manner, the friction stir weld head 120 traverses 206 into the inert purge gas 150 dispensed from the upper inert purge gas source 140. The upper inert purge gas source 140 can include a diffuser 302 that can slow and distribute the inert purge gas 150 as it is dispensed from the upper inert purge gas source 140. The diffuser 302 can be a membrane or element that has multiple openings that regulate the flow of inert purge gas through the diffuser 302. The regulation of the flow of inert purge gas 150 through the diffuser can slow the flow of the inert purge gas 150. Dispensing the inert purge gas 150 in a slow manner can prevent mixing of the inert purge gas 150 with the surrounding environment and keep the inert purge gas 150 in a more contained area as it is not deflected away from where it is dispensed due to the speed of the exiting inert purge gas 150. The upper inert purge gas source 140 can move independently from the friction stir weld head 120 as it traverses 206 along the work piece 110, or the upper inert purge gas source 140 can be coupled to the friction stir weld head 120 so they move as a single unit. By coupling the upper inert purge gas source 140 and the friction stir weld head 120 together, the inert purge gas 150 is consistently dispensed in front of the friction stir weld head 120 so that the friction stir welding by the upper shoulder 122 and pin 124 occurs in an inert purge gas atmosphere. Performing the friction stir welding process in an inert purge gas atmosphere assists in minimizing or preventing the formation of oxides.

A lower inert purge gas source 160 is positioned near the friction stir weld backing 130. The lower inert purge gas source 160 includes a nozzle 163 from which inert purge gas 150 is directed towards the lower surface 203 of the work piece 110 to assist in forming an inert purge gas atmosphere. In the example shown in FIG. 3, the inert purge gas 150 is dispensed behind the direction in which the weld is being formed, i.e. the direction of traverse 206. However, the rotation of the friction stir weld backing 130 can draw the inert purge gas 150 about where the weld is being formed. Alternatively, the positioning of the lower inert purge gas source 160 can be altered to change the are about which the inert purge gas 150 is dispensed or directed about the lower surface 203 of the work piece 110.

The lower inert purge gas source 160 is connected to a carriage 136 of the friction stir weld backing 130. The carriage 136 includes arms 312a, 312b to which the lower inert purge gas source 160 can be coupled. The arms 312a, 312b extend from a ball bearing 310, which prevents the arms 312a, 312b from being rotated by the rotation of the friction stir weld backing 130. The ball bearing 310 allows the friction stir weld backing 130 to rotate an inner race of the ball bearing 310 while the outer race does not rotate. The arms 312a, 312b are attached to the outer race so that they do not rotate with the friction stir weld backing 130. The ball bearing 310 is positioned on the frictions stir weld backing 130 so that the arms 312a, 312b and the lower inert gas source 160 coupled thereto are positioned away from the lower surface 203 of the work piece 110. The arms 312a, 312b can have extensions or fingers 314a, 314b that extend from the arms 312a, 312b towards the lower surface 203 of the work piece 110. The fingers 314a, 314b can contact the lower surface 203 with minimal contact, such as the pointed nature of the fingers 314a, 314b shown in FIG. 3. The minimal contact limits the friction between the fingers 314a, 314b and the lower surface 203 of the work piece 110 as the friction stir welding process traverses 206 along the work piece 110. The friction that is generated can be sufficient enough to assist in preventing or minimizing the amount of rotation of the arms 312a, 312b, since the ball bearing 310 may not completely prevent the friction stir weld backing 130 from imparting rotation to the arms 312a, 312b. Additionally, the fingers 314a, 314b assist in maintaining a separation between the lower surface 203 and the arms 312a, 312b. This separation can be maintained to prevent the lower inert gas source 160 from inadvertently contacting the lower surface 203 as the friction stir welding process traverses 206 along the work piece 110. Alternatively, different carriage designs can be used to couple the lower inert purge gas source 160 to the friction stir weld backing 130 so that the lower inert purge gas source 160 moves with the friction stir welding process as it traverses 206 along the work piece 110.

Figure 4A:
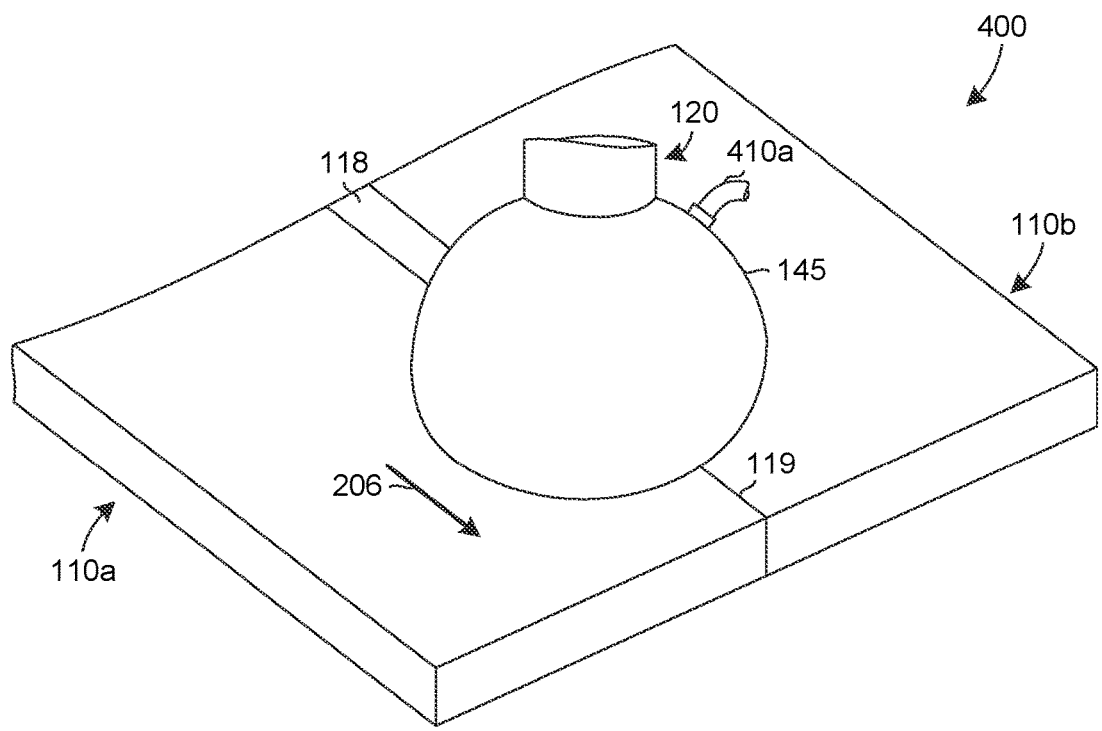
FIG. 4A is a partial perspective view of another example friction stir welding system.
Figure 4B:
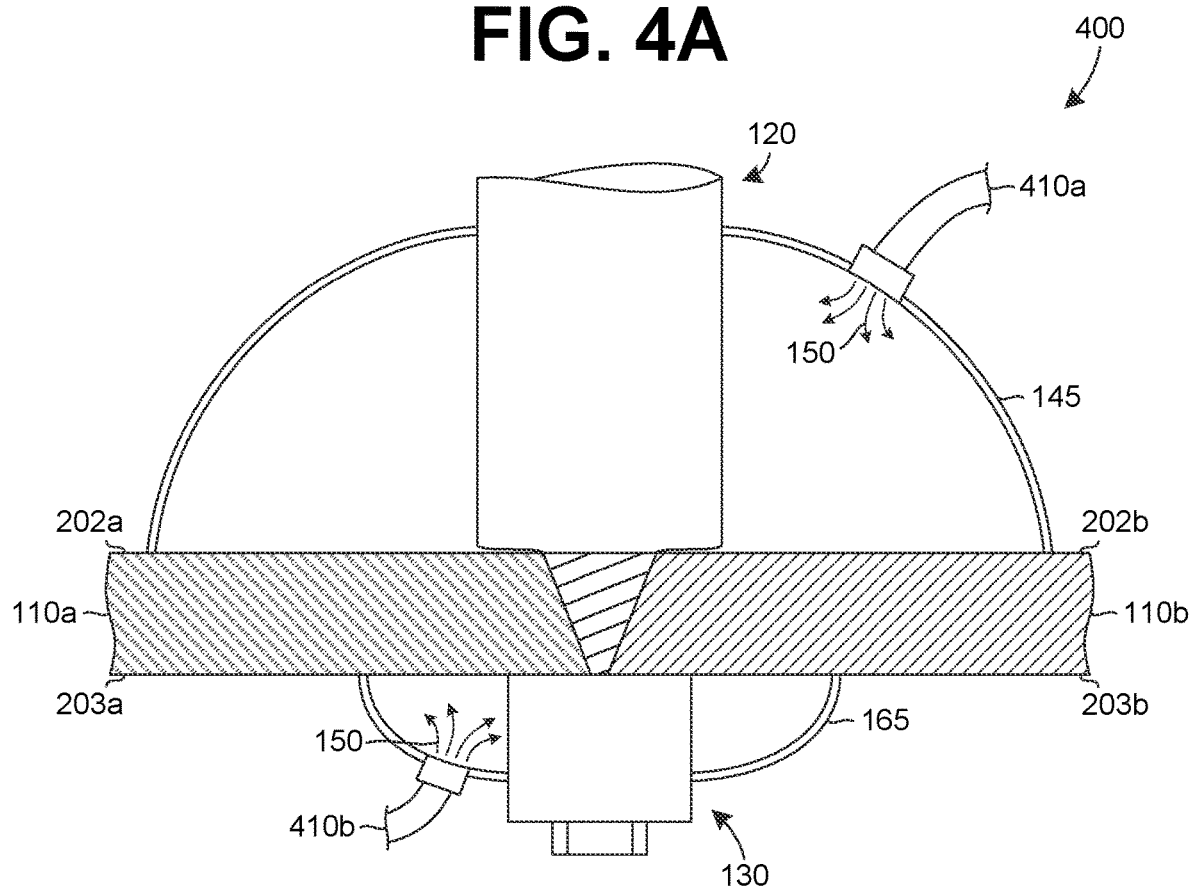
FIG. 4B is a partial cut-away view of the example friction stir welding system of FIG. 4A.

FIG. 4A is a perspective view of an example friction stir welding system 400 and FIG. 4B is a partial cut-away view of the example friction stir welding system 400. The friction stir welding system 400 includes a friction stir weld head 120 and a friction stir weld backing 130 that compress work pieces 110a, 110b along a pathway 119. The friction stir weld head 120 and a friction stir weld backing 130 rotate and traverse 206 along the pathway to create a weld 118 that joins the two work pieces 110a, 110b together. The weld 118 is formed in an inert purge gas atmosphere that assists in minimizing or preventing the formation of oxides.

An upper inert purge gas source 140 includes a housing 145 that assists in containing the inert purge gas 150 about the friction stir weld head 120 where the weld 118 is being formed. In the example of FIGS. 4A-4B, the housing 145 is hemispherical with a large, open end positioned about the pathway 119 and above the upper surfaces 202a, 202b of the work pieces 110a, 110b. The smaller, closed end of the hemispherical housing, the end including an apex of the curve of the hemisphere, is positioned about the friction stir weld head 120. The housing 145 is coupled to the friction stir weld head 120 so the inert gas atmosphere contained by the housing 145 moves with the friction stir weld head 120 during the friction stir welding process. In this example, the housing 145 is centered about the friction stir weld head 120 so that the inert gas atmosphere extends both ahead of and behind the friction stir weld head 120. By extending behind the friction stir weld head 120, the inert gas atmosphere contained by the housing 145 is maintained over the recently formed weld 118 for a period of time, such as while the weld 118 cools. Maintaining the inert purge gas atmosphere over the recently formed weld 118 can also assist in minimizing or preventing the formation of oxides, since oxides may be more readily formed in the recently formed weld 118 due to the residual heat in the work pieces 110a, 110b caused by the friction stir welding process. Allowing the recently formed weld 118 to cool, at least partially, in the inert purge gas atmosphere contained by the housing 145 can prevent the recently formed, oxide-susceptible weld 118 from being exposed to the normal environment. As the friction stir weld head 120 traverses 206 along the pathway 119, the formed weld 118 will become exposed to the normal environment, but will have cooled to a sufficient level that the risk of oxide formation is significantly reduced from the risk of oxide formation without the inert gas environment.

The housing 145 includes an inlet 410a through which the inert purge gas 150 can be dispensed into the housing 145. The flow of inert purge gas 150 into the housing 145 can be substantially constant to maintain the inert purge gas atmosphere within the housing 145. The inlet 410a can be coupled by tubing to the source of the inert purge gas 150 and the tubing can allow the housing 145 to move with the friction stir weld head 120 while maintaining the flow of inert purge gas 150 to the housing 145 during the friction stir welding process. Alternatively, the inert purge gas 150 can be introduced to the housing 145 prior to the friction stir welding process and the source of the inert purge gas 150 can then be disconnected from the housing 145. In this manner, the inert purge gas atmosphere within the housing 145 is formed initially and additional inert purge gas 150 is not added during the friction stir welding process. This can allow the friction stir weld head 120 to move freely or easily since the housing 145 is not coupled the inert purge gas 150 source continuously during the friction stir welding process. In another alternative, the inlet 410a of the housing 145 can be connected to the inert purge gas source 150 during the friction stir welding process to replenish the inert purge gas atmosphere within the housing 145.

To assist with containing the inert purge gas 150 within the housing 145, the housing 145 can include an interface that contacts the upper surfaces 202a, 202b of the work pieces 110a, 110b to assist in preventing the flow of inert purge gas 150 from the housing 145. In an example, the interface can be a flexible skirt that extends from the perimeter of the large, open end of the housing 145 and contacts the upper surfaces 202a, 202b. The flexible nature of the skirt does not impede the traverse 206 of the friction stir weld head 120 and housing 145 and can reduce or minimize the flow of inert purge gas 150 from the housing 145. In another example, the interface can be a brush strip or door sweep-like interface that includes densely packed fibers that extend from the perimeter of the large, open end of the housing 145 and contacts the upper surfaces 202a, 202b. The densely packed nature of the interface slows the escape of inert purge gas 150 from the housing 145. In yet another example, a liquid interface can be used to prevent the flow of inert purge gas 150 from the housing 145. A liquid can be placed between the perimeter of the housing 145 and the upper surfaces 202a, 202b. The surface tension of the liquid can form a barrier between the perimeter of the housing 145 and the upper surfaces 202a, 202b, and can help contain the inert purge gas 150 within the housing 145.

In a further example, the interface can be made of a solid material that is less hard than the work pieces 110a, 110b and has a low coefficient of friction. The low coefficient of friction will allow the interface to move easily across the upper surfaces 202a, 202b without impeding the traverse 206 of the friction stir weld head 120 and the housing 145. The lower hardness of the interface prevents it from scratching or damaging the upper surfaces 202a, 202b, allowing the interface to directly contact the upper surfaces 202a, 202b and minimize the separation between the interface and upper surfaces 202a, 202b. By minimizing the separation, the area through which inert purge gas 150 can flow from the housing 145 is reduced. While any design of the interface may allow some portion of the inert purge gas 150 to escape the housing 145, the constant flow of inert purge gas 150 into the housing 145 prevents the normal atmosphere from entering the housing 145, which maintains the inert purge gas atmosphere about the friction stir welding process.

The housing 145 can be coupled directly to the friction stir weld head 120 or can be attached to a carriage that moves with the friction stir weld head 120, such as a carriage coupled to the friction stir weld head 120 or a separate carriage that moves with the friction stir weld head 120. In an embodiment in which the housing 145 is coupled directly to the friction stir weld head 120 or to a carriage of the friction stir weld head 120, the housing 145 can be coupled in a manner so that the housing 145 does not rotate with the friction stir weld head 120. For example, the closed end housing can be coupled to a portion of the friction stir weld head 120 that does not rotate. In another example, the housing 145 can be coupled to a carriage of the frictions stir weld head 120, such as a ball bearing similar to 310 of FIG. 3. The friction stir weld head 120 can include a ball bearing, with the inner race of the bearing rotating with the friction stir weld head 120, while the outer race is coupled to the housing 145 and does not substantially rotate with the friction stir weld head 120.

A housing 165, similar to the housing 145, can be positioned beneath the work pieces 110a, 110b to form an inert purge gas atmosphere about the lower surfaces 203a, 203b during the friction stir welding process. Like the housing 145, the housing 165 can be hemispherical and can contain an inert purge gas atmosphere about the friction stir weld backing 130. The housing 165 can similarly include an interface between the housing 145 and the lower surfaces 203a, 203b. Additionally, the housing 165 can include an inlet 410b to flow inert purge gas 150 into the housing 165. The housing 165 can move with the friction stir weld backing 130 during the friction stir welding process and can be coupled directly to the friction stir weld backing 130 or a carriage, similar to the housing 145.

In the example of FIGS. 4A-4B, the housings 145, 165 are hemispherical in shape and centered about the friction stir weld head 120 and friction stir weld backing 130, respectively. In alternative embodiments, the housing 145, 165 can be similarly shaped, i.e. both can have the same shape, but have a shape other than a hemispherical shape. For example, the housings 145, 165 can be semi-ovoid, rectangle, square or other shaped. The shape can be selected based on a variety of factors, such as the size of the weld 118 being formed, the duration which the weld 118 should remain in the inert gas atmosphere after being formed, the shape or profile of the work pieces 110a, 110b, other considerations, or combinations thereof. In an embodiment, the housings 145, 165 can be semi-rigid or flexible to allow them to conform to the profile of the work pieces 110a, 110b, such as to allow the friction stir welding process to occur on work pieces having a curved profile. In another embodiment, the housings 145, 165 can be rigid. Additionally, the housings 145 and 165 can be dissimilar, such as each having a different shape, size or other characteristics.

Figure 5:
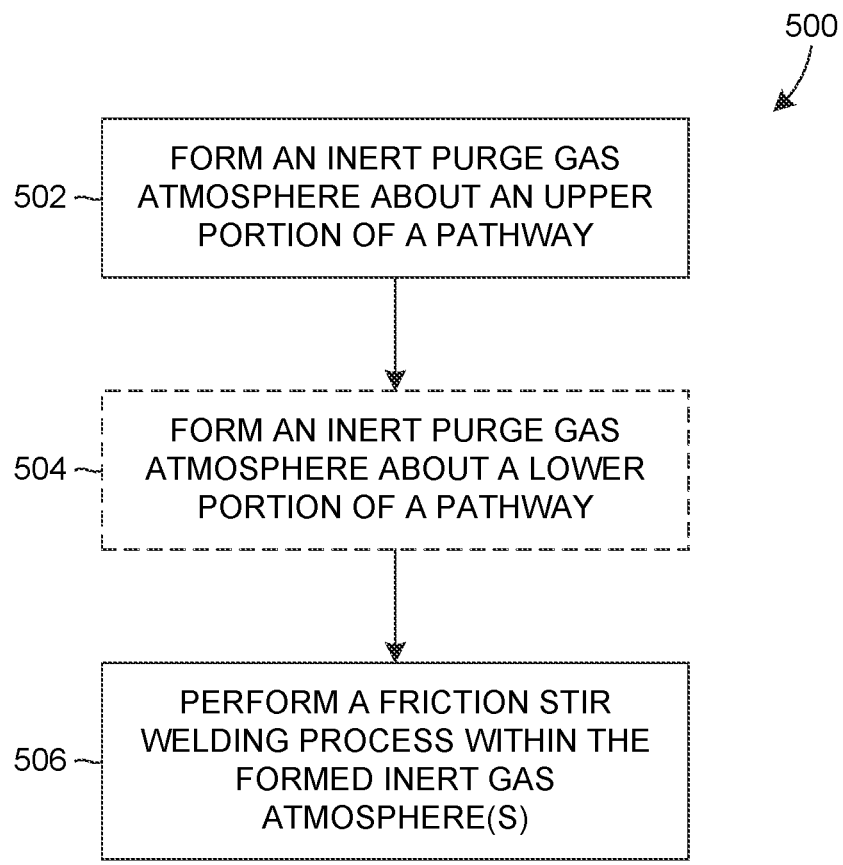
FIG. 5 is a process diagram of an example friction stir welding method.

FIG. 5 is an example friction stir welding method 500. The method 500 includes forming an inert purge gas atmosphere in which a friction stir welding process will occur. By performing the friction stir welding process in the inert purge gas atmosphere, the formation of oxides due to the friction stir welding process will be reduced or minimized. The formation of oxides in the work pieces joined by the friction stir welding process can weaken the weld and cause it to mechanically fail.

At 502, an inert purge gas atmosphere is formed about an upper portion of a pathway. The pathway is the abutment of the two work pieces, along which the friction stir welding process will occur to join the two work pieces. The inert purge gas atmosphere is formed about the pathway at the upper surfaces of the two work pieces, which are the surfaces that are contacted by an upper shoulder of a friction stir weld head.

At 504, an inert purge gas atmosphere is, optionally, formed about a lower portion of the pathway. The inert purge gas atmosphere is formed about the pathway at the lower surfaces of the two work pieces, which are the surfaces that are contacted by a friction stir weld backing. The combination of 502 and 504 forms an inert purge gas atmosphere about the upper and lower portions of the pathway, which assists in reducing the formation of oxides caused by the friction stir welding process.

At 506, a friction stir welding process is performed within the inert purge gas atmosphere(s). As previously discussed, performing the friction stir welding process in such a manner assists in minimizing or preventing oxide formation as a result of the friction stir welding process. By reducing the formation of oxides, higher quality welds can be formed by the friction stir welding process. Additionally, the tolerances of the friction stir welding process, such as the rotational and traverse speeds of the friction stir weld head, are expanded while a similar quality of weld is maintained. This can allow the friction stir welding process to be sped up while maintaining a good quality of weld formation. Further, the inert purge gas atmosphere can allow some materials to be friction stir welded, such as high lithium content Al—Li alloys. High lithium content Al—Li alloys can be prone to oxide formation, making them unsuitable to be joined using friction stir welding. However, the inert purge gas atmosphere assists in minimizing or preventing oxide formation, which allows such high lithium content Al—Li alloys to be joined using friction stir welding.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

The invention claimed is:

1. A friction stir welding system, comprising:
    a friction stir weld head on a first side of multiple work pieces to join the multiple work pieces along a weld pathway;
    a friction stir weld backing spaced apart from the friction stir weld head by at least a portion of the multiple work pieces, the friction stir weld backing on a second side of the multiple work pieces opposite the first side of the multiple work pieces;
    an inert purge gas source to output inert purge gas on the first side of the multiple work pieces;
    a housing configured to at least partially contain the inert purge gas about the weld pathway on the first side of the multiple work pieces, wherein the inert purge gas source is located so as to output the inert purge gas between the housing and the first side of the multiple work pieces;
    a second inert purge gas source to output the inert purge gas on the second side of the multiple work pieces; and
    a second housing configured to at least partially contain the inert purge gas about the weld pathway on the second side of the multiple work pieces, wherein the second inert purge gas source is located so as to output the inert purge gas between the second housing and the second side of the multiple work pieces.

2. The friction stir welding system of claim 1, wherein the inert purge gas source comprises an inlet on the housing and facing the first side of the multiple work pieces.

3. The friction stir welding system of claim 1, wherein the housing is coupled directly to the friction stir weld head via ball bearings.

4. The friction stir welding system of claim 1, wherein the housing is configured to move with the friction stir weld head during a friction stir welding process.

5. The friction stir welding system of claim 1, wherein the housing extends both ahead and behind the friction stir weld head so as to be configured to maintain, for a period of time, an inert purge gas atmosphere over a recently formed weld produced by the friction stir weld head.

6. The friction stir welding system of claim 1, wherein the inert purge gas source comprises tubing to allow the housing to move with the friction stir weld head while maintaining flow of the inert purge gas to the housing during a friction stir welding process.

7. The friction stir welding system of claim 1, further comprising a skirt that is flexible so as to be configured to conform to curved profiles of the multiple work pieces, wherein the flexible skirt is attached to the housing and extends from a perimeter of the housing, and the flexible skirt is configured to contact the first side of the multiple work pieces.

8. The friction stir welding system of claim 1, wherein the housing comprises a brush that extends from a perimeter of the housing and is configured to contact the first side of the multiple work pieces.

9. The friction stir welding system of claim 1, wherein the housing comprises a liquid interface that extends from a perimeter of the housing and is configured to contact the first side of the multiple work pieces.

10. The friction stir welding system of claim 1, wherein the housing includes an interface that extends from a perimeter of the housing and is configured to contact the first side of the multiple work pieces, wherein the interface comprises a solid material that is less hard than the multiple work pieces.

11. The friction stir welding system of claim 1, wherein the housing is semi-rigid or flexible so as to be configured to conform to profiles of the multiple work pieces.

12. The friction stir welding system of claim 11, wherein the profiles of the multiple work pieces are curved.

13. A friction stir welding system, comprising:
a friction stir weld head configured to be on a top side of multiple work pieces to join the multiple work pieces along a weld pathway;
an inert purge gas source configured to output inert purge gas on the top side of the multiple work pieces;
a housing configured to at least partially contain the inert purge gas about the weld pathway on the top side of the multiple work pieces, wherein the inert purge gas source is located so as to output the inert purge gas between the housing and the top side of the multiple work pieces, and wherein the housing is flexible so as to be configured to conform to curved profiles of the multiple work pieces;
a second inert purge gas source configured to output the inert purge gas on a bottom side of the multiple work pieces; and
a second housing configured to at least partially contain the inert purge gas about the weld pathway on the bottom side of the multiple work pieces, wherein the second inert purge gas source is located so as to output the inert purge gas between the second housing and the bottom side of the multiple work pieces.

14. The friction stir welding system of claim 13, wherein the housing is coupled directly to the friction stir weld head via ball bearings.

15. The friction stir welding system of claim 13, wherein the housing is configured to move with the friction stir weld head during a friction stir welding process.

16. The friction stir welding system of claim 13, further comprising a friction stir weld backing spaced apart from the friction stir weld head by at least a portion of the multiple work pieces, the friction stir weld backing on a bottom side of the multiple work pieces opposite the top side of the multiple work pieces.

17. The friction stir welding system of claim 13, wherein the housing extends both ahead and behind the friction stir weld head so as to be configured to maintain, for a period of time, an inert purge gas atmosphere over a recently formed weld produced by the friction stir weld head.

18. A friction stir welding system, comprising:
a friction stir weld head on a top side of multiple work pieces to join the multiple work pieces along a weld pathway;
a friction stir weld backing spaced apart from the friction stir weld head by at least a portion of the multiple work pieces, the friction stir weld backing on a bottom side of the multiple work pieces opposite the top side of the multiple work pieces;
an inert purge gas source to output inert purge gas on the top side of the multiple work pieces;
a housing configured to at least partially contain the inert purge gas about the weld pathway on the top side of the multiple work pieces, wherein the inert purge gas source is located so as to output the inert purge gas between the housing and the top side of the multiple work pieces;
a second inert purge gas source to output the inert purge gas i) on the bottom side of the multiple work pieces and ii) on sides of the friction stir weld backing; and
a second housing configured to at least partially contain the inert purge gas about the weld pathway on the bottom side of the multiple work pieces, wherein the second inert purge gas source is located so as to output the inert purge gas between the second housing and the bottom side of the multiple work pieces.

* * * * *